United States Patent
Park

(10) Patent No.: US 9,673,616 B2
(45) Date of Patent: Jun. 6, 2017

(54) POWER CONVERTER, DISPLAY DEVICE INCLUDING POWER CONVERTER, SYSTEM INCLUDING DISPLAY DEVICE, AND METHOD OF DRIVING DISPLAY DEVICE

(71) Applicant: SAMSUNG DISPLAY CO., LTD., Yongin, Gyeonggi-Do (KR)

(72) Inventor: Sung-Cheon Park, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 325 days.

(21) Appl. No.: 14/467,725

(22) Filed: Aug. 25, 2014

(65) Prior Publication Data

US 2014/0362072 A1 Dec. 11, 2014

Related U.S. Application Data

(63) Continuation of application No. 13/137,114, filed on Jul. 21, 2011, now Pat. No. 8,817,429.

(30) Foreign Application Priority Data

Nov. 23, 2010 (KR) .................. 10-2010-0116832
May 18, 2011 (KR) .................. 10-2011-0046580

(51) Int. Cl.
*H02H 9/02* (2006.01)
*G09G 3/36* (2006.01)
(Continued)

(52) U.S. Cl.
CPC ............. *H02H 9/02* (2013.01); *G09G 3/006* (2013.01); *G09G 3/32* (2013.01); *G09G 3/3696* (2013.01);
(Continued)

(58) Field of Classification Search
CPC H02H 9/02; G09G 3/006; G09G 3/32; G09G 3/3696; G09G 2330/025; G09G 2310/0289; H05B 33/0887; H05B 33/0896
(Continued)

(56) References Cited

U.S. PATENT DOCUMENTS 5,515,390 A    5/1996  Benton
7,443,641 B2  10/2008  Suzuki
(Continued)

FOREIGN PATENT DOCUMENTS

CN    101675465 A    3/2010
EP    1 783 536 A1   5/2007
(Continued)

OTHER PUBLICATIONS

Provisional double patenting rejection of claims in parent U.S. Appl. No. 13/137,114; USPTO Office action mailed Aug. 19, 2014, in U.S. Appl. No. 13/197,054.

*Primary Examiner* — Thienvu Tran
*Assistant Examiner* — Kevin J Comber
(74) *Attorney, Agent, or Firm* — Lee & Morse, P.C.

(57) ABSTRACT

A power converter includes a voltage conversion unit that provides a first driving voltage at a first output electrode by converting a power supply voltage in response to a first control signal, the voltage conversion unit being configured to provide a second driving voltage at a second output electrode by converting the power supply voltage after a short detection period, the voltage conversion unit being configured to shut down in response to a third control signal, and a short detection unit that generates the third control signal by comparing a magnitude of a voltage of the second output electrode with a magnitude of a reference voltage during the short detection period.

7 Claims, 20 Drawing Sheets

(51) Int. Cl.
G09G 3/00 (2006.01)
G09G 3/32 (2016.01)
H05B 33/08 (2006.01)

(52) U.S. Cl.
CPC . *H05B 33/0887* (2013.01); *G09G 2310/0289* (2013.01); *G09G 2330/00* (2013.01); *G09G 2330/028* (2013.01); *H05B 33/0896* (2013.01)

(58) Field of Classification Search
USPC .......................................................... 361/18
See application file for complete search history.

(56) References Cited

U.S. PATENT DOCUMENTS

| | | |
|---|---|---|
| 2005/0007316 A1 | 1/2005 | Akimoto et al. |
| 2011/0025667 A1 | 2/2011 | Chung |
| 2012/0050249 A1 | 3/2012 | Jin et al. |

FOREIGN PATENT DOCUMENTS

| | | |
|---|---|---|
| JP | 2000-214423 A | 8/2000 |
| JP | 2003-229490 A | 8/2003 |
| JP | 2005-098785 A | 4/2005 |
| JP | 2006-042079 A | 2/2006 |
| JP | 2007-089239 A | 4/2007 |
| JP | 2009-237200 A | 10/2009 |
| JP | 2010-011566 A | 1/2010 |
| JP | 2010-026393 A | 2/2010 |
| KR | 10 2000-0060439 A | 10/2000 |
| KR | 10 2001-0019944 A | 3/2001 |
| KR | 10 2002-0034607 A | 5/2002 |
| KR | 10 2004-0058780 A | 7/2004 |
| KR | 10-2009-0105227 A | 10/2009 |
| KR | 10 2011-0012310 A | 2/2011 |

POWER CONVERTER, DISPLAY DEVICE INCLUDING POWER CONVERTER, SYSTEM INCLUDING DISPLAY DEVICE, AND METHOD OF DRIVING DISPLAY DEVICE

CROSS REFERENCE TO RELATED APPLICATION

This is a continuation application based on pending application Ser. No. 13/137,114, filed Jul. 21, 2011, the entire contents of which is hereby incorporated by reference.

BACKGROUND

1. Field

Embodiments relate to a power converter, a display device including a power converter, a system including a display device, and a method of driving display device.

2. Description of the Related Art

Generally, a display device includes a display panel having a plurality of pixels arranged in a matrix form. Each of the plurality of pixels operates in response to a driving voltage.

For example, each of the plurality of pixels included in an organic light emitting display may have an organic light emitting diode (OLED). The OLED generates light by coupling holes, which are provided from an anode to which a positive driving voltage (ELVDD) is applied, and electrons, which are provided from a cathode to which a negative driving voltage (ELVSS) is applied, in an organic material layer formed between the anode and the cathode.

SUMMARY

An embodiment is directed to a power converter, including a voltage conversion unit that provides a first driving voltage at a first output electrode by converting a power supply voltage in response to a first control signal, the voltage conversion unit being configured to provide a second driving voltage at a second output electrode by converting the power supply voltage after a short detection period, the voltage conversion unit being configured to shut down in response to a third control signal, and a short detection unit that generates the third control signal by comparing a magnitude of a voltage of the second output electrode with a magnitude of a reference voltage during the short detection period.

The voltage conversion unit may include a control unit that enables a first driving signal and that enables a second control signal during the short detection period when the first control signal is enabled, the control unit being configured to enable a second driving signal and to disable the second control signal after the short detection period, the control unit being configured to provide the second control signal to the short detection unit, the control unit being configured to disable the first driving signal and the second driving signal when the third control signal is enabled, a first voltage converter that generates the first driving voltage by converting the power supply voltage while the first driving signal is enabled, and a second voltage converter that generates the second driving voltage by converting the power supply voltage while the second driving signal is enabled.

The control unit may include a timing generator that controls a length of the short detection period.

The voltage conversion unit may further include a comparator that provides an enabled fourth control signal to the timing generator when a magnitude of the first driving voltage is equal to or larger than a magnitude of a target voltage, and the timing generator may control the length of the short detection period based on a length of a time period from a time when the first control signal is enabled to a time when the fourth control signal is enabled.

The short detection unit may sense the magnitude of the voltage of the second output electrode at a time during the short detection period and compare the sensed magnitude of the voltage of the second output electrode with the magnitude of the reference voltage to generate the third control signal.

The short detection unit may include a comparator that enables the third control signal when the magnitude of the voltage of the second output electrode is equal to or larger than the magnitude of the reference voltage and that disables the third control signal when the magnitude of the voltage of the second output electrode is smaller than the magnitude of the reference voltage, and a first switch connected between the power supply voltage and the comparator and configured to selectively provide the power supply voltage to the comparator in response to a second control signal, the second control signal being configured to be enabled during the short detection period and configured to be disabled after the short detection period.

The first switch may be turned on to provide the power supply voltage to the comparator when the second control signal is enabled, and may be turned off to stop providing the power supply voltage to the comparator when the second control signal is disabled.

The short detection unit may further includes a pull-down unit connected between the second output electrode and a ground voltage, the pull-down unit being configured to be turned on in response to the second control signal.

The pull-down unit may include a pull-down register, a first terminal of the pull-down register being connected to the second output electrode, and a second switch connected between a second terminal of the pull-down register and the ground voltage, the second switch being configured to be turned on when the second control signal is enabled, and to be turned off when the second control signal is disabled.

The second switch may include NMOS transistor, the NMOS transistor having a drain connected to the second terminal of the pull-down register, a source connected to the ground voltage and a gate receiving the second control signal.

The short detection unit may further include an inverter that generates an inverted control signal by inverting the second control signal, and a second switch connected between an output electrode of the comparator and the ground voltage, the second switch being configured to be turned on in response to the inverted control signal.

The second switch may be turned off to separate the output electrode of the comparator from the ground voltage when the inverted control signal is disabled, and may be turned on to disable the third control signal when the inverted control signal is enabled.

The short detection unit may further include a reference voltage generator that generates the reference voltage.

The first driving voltage may have a positive potential and the second driving voltage may have a negative potential.

The first driving voltage may have a negative potential and the second driving voltage may have a positive potential.

Another embodiment is directed to a display device, including a display panel including a plurality of pixels, the plurality of pixels being configured to operate in response to a first driving voltage, a second driving voltage, and a data signal, a power converter that provides the first driving voltage at a first output electrode of the power converter and that provides the second driving voltage at a second output electrode of the power converter at a time interval of a short detection period in response to a first control signal, the power converter being configured to shut down when a magnitude of a voltage of the second output electrode is equal to or larger than a magnitude of a reference voltage during the short detection period, and a driving unit that provides the data signal to the display panel and that provides the first control signal to the power converter.

The first driving voltage may have a positive potential and the second driving voltage may have a negative potential.

The first driving voltage may have a negative potential and the second driving voltage may have a positive potential.

The short detection period may correspond to N frame cycles, where N is a positive integer.

The power converter may connect the second output electrode to a ground voltage through a pull-down register during the short detection period.

The driving unit may provide a data signal corresponding to black color to the display panel during the short detection period.

The driving unit may provide the data signal corresponding to black color to the display panel for at least one frame cycle from the end of the short detection period.

The power converter may include a voltage conversion unit that provides the first driving voltage at the first output electrode by converting a power supply voltage in response to the first control signal, the voltage conversion unit being configured to provide the second driving voltage at the second output electrode by converting the power supply voltage after the short detection period, the voltage conversion unit being configured to shut down in response to a third control signal, and a short detection unit that generates the third control signal by comparing a magnitude of a voltage of the second output electrode with a magnitude of the reference voltage during the short detection period.

Each of the plurality of pixels may include an organic fight emitting diode.

Another embodiment is directed to a method of driving a display device, the method including providing a first driving voltage from a first output electrode of a power converter to a display panel, comparing a magnitude of a voltage of a second output electrode of the power converter with a magnitude of a reference voltage during a short detection period, providing a second driving voltage from the second output electrode of the power converter to the display panel after the short detection period when the magnitude of the voltage of the second output electrode is kept smaller than the magnitude of the reference voltage daring the short detection period, and shutting down the power converter when the magnitude of the voltage of the second output electrode is equal to or larger than the magnitude of the reference voltage during the short detection period.

The first driving voltage may have a positive potential and the second driving voltage may have a negative potential.

The first driving voltage may have a negative potential and the second driving voltage may have a positive potential.

The method may further include connecting the second output electrode of the power converter to a ground voltage through a pull-down register during the short detection period.

The method may further include providing a data signal corresponding to black color to the display panel before providing the first driving voltage to the display panel.

Providing the data signal may include providing the data signal corresponding to black color to the display panel during the short detection period and for at least one frame cycle from the end of the short detection period.

The display panel may include an organic light emitting diode.

Another embodiment is directed to a system, including a storage device that stores image data, a display device that displays the image data, and a processor that controls the storage device and the display device. The display device may include a display panel including a plurality of pixels, the plurality of pixels being configured to operate in response to a first driving voltage, a second driving voltage, and a data signal, a power converter that provides the first driving voltage at a first output electrode of the power converter and that provides the second driving voltage at a second output electrode of the power converter at a time interval of a short detection period in response to a first control signal, the power converter being configured to shut down when a magnitude of a voltage of the second output electrode is equal to or larger than a magnitude of a reference voltage during the short detection period, and a driving unit that provides the data signal to the display panel and that provides the first control signal to the power converter.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
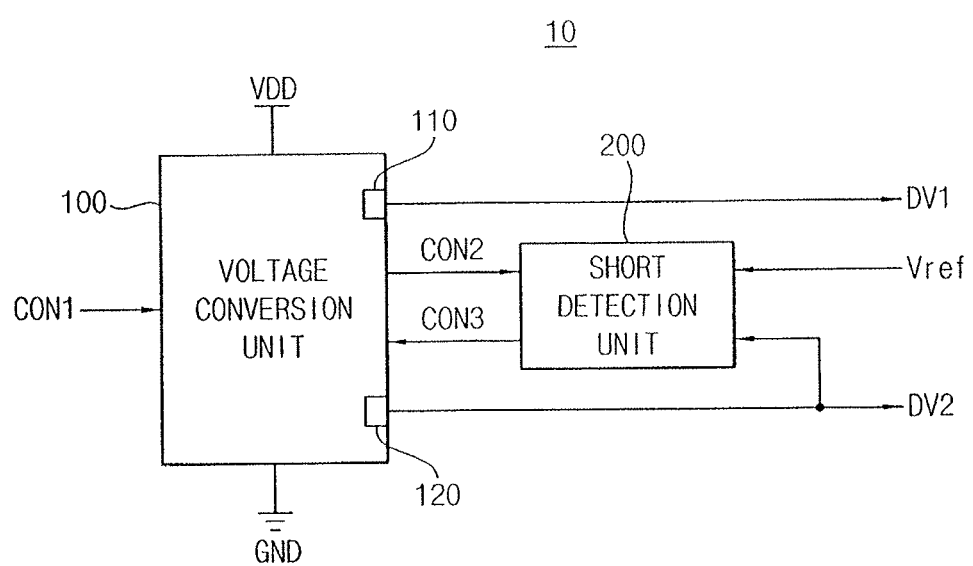
FIG. 1 illustrates a block diagram of a power converter according to example embodiments.

Korean Patent Application No. 10-2010-0116832, filed on Nov. 23, 2010, in the Korean Intellectual Property Office, and entitled: "DC-DC Converter, Display Device Including DC-DC Converter, System Including Display Device and Method of Driving Display Device," and Korean Patent Application No. 10-2011-0046580, filed on May 18, 2011, in the Korean Intellectual Property Office, and entitled:

"Power Converter, Display Device including Power Converter, System Including Display Device and Method of Driving Display Device," are incorporated by reference herein in its entirety Example embodiments will now be described more full hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that en a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

It will be understood that, although the terms first, second, etc., may be used herein to describe various elements, these elements should not be limited by these terms. Rather, these terms are merely used to aide in distinguishing one element from another. For example, a first element could be termed a second element, and, similarly, a second element could be termed a first element. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of a power converter 10 according to example embodiments.

In the example embodiment shown in FIG. 1, the power converter 10 includes a voltage conversion unit 100 and a short detection unit 200.

The voltage conversion unit 100 may provide a first driving voltage DV1 at a first output electrode 110 by converting to power supply voltage VDD, and may enable a second control signal CON2 during a short detection period in response to a first control signal CON1 received from an external device. The voltage conversion unit 100 may disable the second control signal CON2 and provide a second driving voltage DV2 at a second output electrode 120 by converting the power supply voltage VDD after the short detection period. The voltage conversion unit 100 may shut down in response to a third control signal CON3. For example, the voltage conversion unit 100 may stop generating the first driving voltage DV1 and the second driving voltage DV2 in response to the third control signal CON3.

The short detection unit 200 may generate the third control signal CON3 by comparing a magnitude of a voltage of the second output electrode 120 with a magnitude of a reference voltage Vref during the short detection period. The short detection unit 200 may stop operating after the short detection period. For example, the short detection unit 200 may operate when the second control signal CON2 is enabled and stop operating when the second control signal CON2 is disabled.

In some example embodiments, the short detection unit 200 may sense the magnitude of the voltage of the second output electrode 120 at a time during the short detection period and compare the sensed magnitude of the voltage of the second output electrode 120 with the magnitude of the reference voltage Vref to generate the third control signal CON3.

The first control signal CON1, the second control signal CON2, and the third control signal CON3 may be enabled at a logic high level and be disabled at a logic low level.

Figure 2:
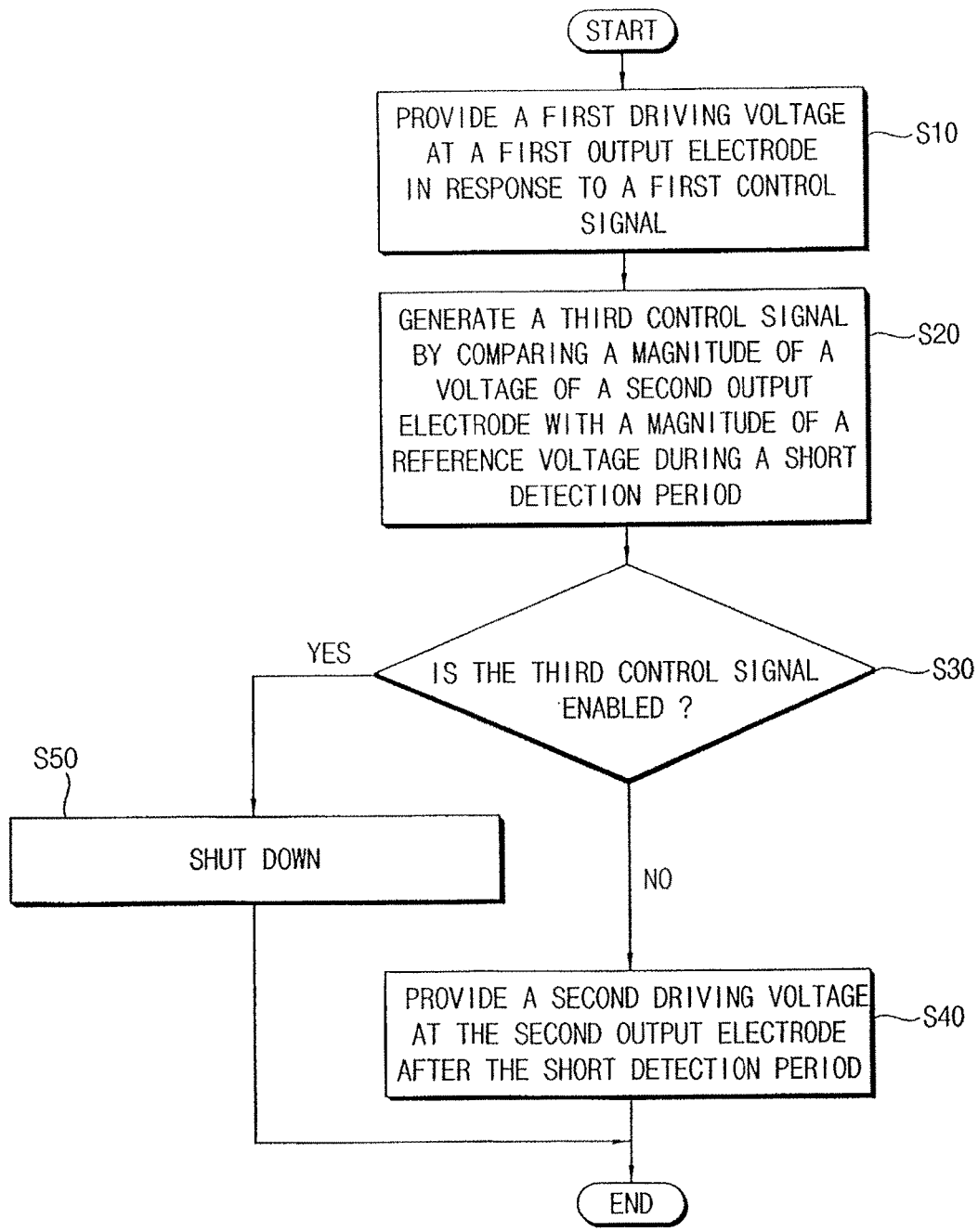
FIG. 2 illustrates a flow chart of an example of a method of driving a power converter of FIG. 1 according to an example embodiment.

FIG. 2 illustrates a flow chart of an example of a method of driving a power converter of FIG. 1 according to an example embodiment.

In the example embodiment shown in FIG. 2, the voltage conversion unit 100 may provide the first driving voltage DV1 at the first output electrode 110 by converting the power supply voltage VDD and may enable the second control signal CON2 during the short detection period in response to the first control signal CON1 (operation S10 in FIG. 2).

The short detection unit 200 may generate the third control signal CON3 by comparing the magnitude of the voltage of the second output electrode 20 with the magnitude of the reference voltage Vref during the short detection period, and may provide the third control signal CON3 to the voltage conversion unit 100 (operation S20). The voltage conversion unit 100 may determine whether the third control signal CON3 is enabled during the short detection period (operation S30 in FIG. 2).

With reference to the state of the third control signal CON3 in operation S30, if the third control signal CON3 is kept disabled during the short detection period, the voltage conversion unit 100 may disable the second control signal CON2 and provide the second driving voltage DV2 at the second output electrode 120 by converting the power supply voltage VDD after the short detection period, so that the voltage conversion unit 100 may perform a normal operation after the short detection period (operation S40 in FIG. 2).

With further reference to the state of the third control signal CON3 in operation S30, if the third control signal CON3 is enabled during the short detection period, the voltage conversion unit 100 may shut down to stop generating the first driving voltage DV1 and the second driving voltage DV2 (operation S50 in FIG. 2).

As described above, the power converter 10 may provide the first driving voltage DV1 at the first output electrode 110 and the second driving voltage DV2 the second output electrode 120 at a time interval of the short detection period. The power converter 10 may determine whether the magnitude of the voltage of the second output electrode 120 increases according to an increase of the magnitude of the first driving voltage DV1 during the short detection period. If the magnitude of the voltage of the second output electrode 120 increases over the magnitude of the reference voltage Vref during the short detection period, the power converter 10 may determine that a wiring connected to the first output electrode 110 and a wiring connected to the second output electrode 120 are shorted with each other and stop generating the first driving voltage DV1 and the second driving voltage DV2.

Figure 3:
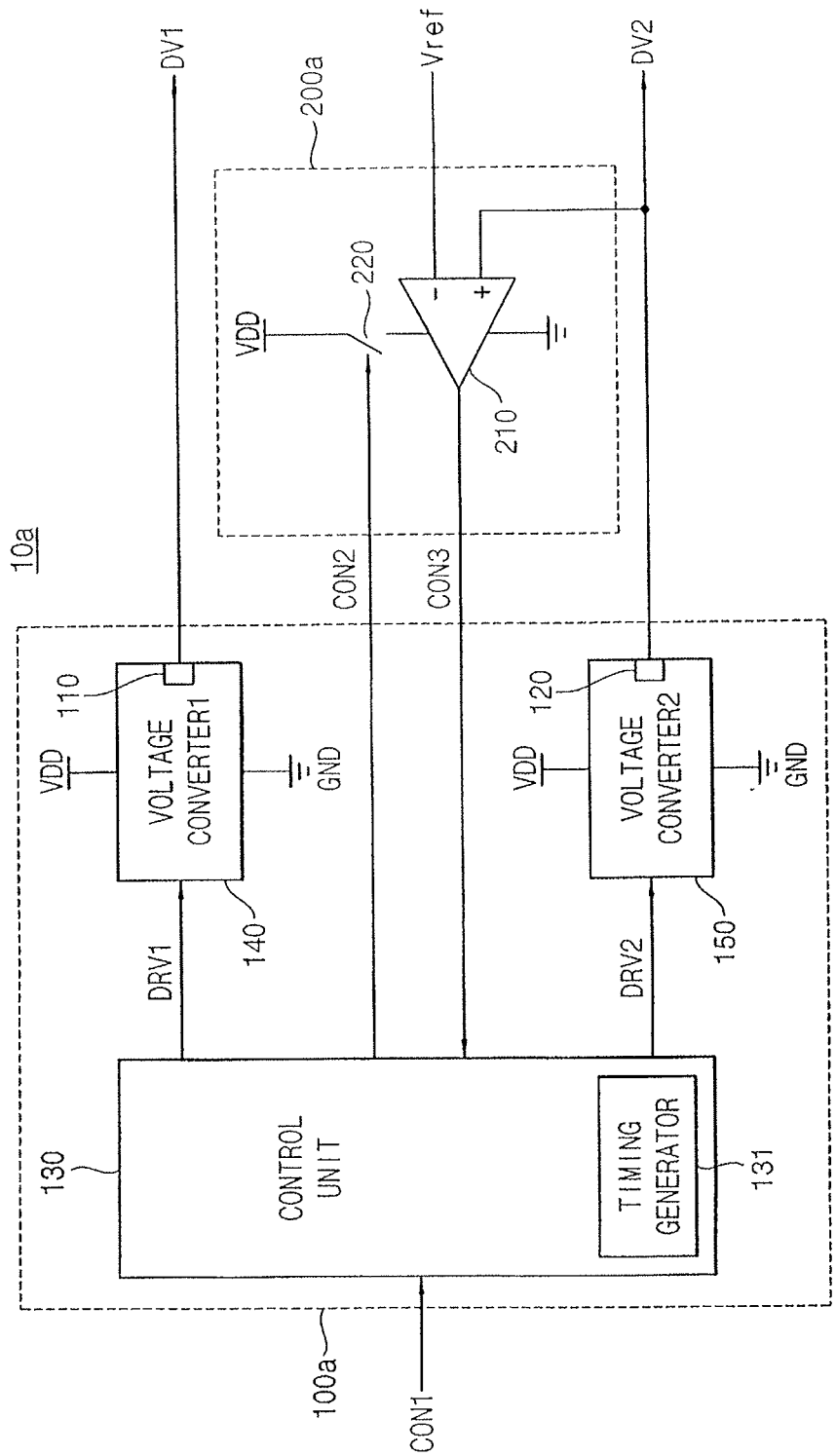
FIGS. 3, 4, 5, 6 and 7 illustrate block diagrams of examples of a power converter of FIG. 1.

FIG. 3 illustrates a block diagram of an example of the power converter 10 of FIG. 1.

In the example embodiment shown in FIG. 3, a power converter 10a includes a voltage conversion unit 100a and a short detection unit 200a.

The voltage conversion unit 100a may include a control unit 130, a first voltage converter 140, and a second voltage converter 150.

The control unit 130 may enable a first driving signal DRV1 and enable the second control signal CON2 during the short detection period when the first control signal CON1 is enabled. The control unit 130 may enable a second driving signal DRV2 and disable the second control signal CON2 after the short detection period. The control unit 130 may disable the first driving signal DRV1 and the second driving signal DRV2 when the third control signal CON3 is enabled during the short detection period.

The first voltage converter 140 may generate the first driving voltage DV1 by converting the power supply voltage VDD while the first driving signal DRV1 is enabled, and output the first driving voltage DV1 through the first output electrode 110.

The second voltage converter 150 may generate the second driving voltage DV2 by converting the power supply voltage VDD while the second driving signal DRV2 is enabled, and output the second driving voltage DV2 through the second output electrode 120.

The first voltage converter 140 and the second voltage converter 150 may be embodied in various forms.

The short detection unit 200a may include a comparator 210 and a first switch 220.

The comparator 210 may be provided with the power supply voltage VDD to operate. The comparator 210 may enable the third control signal CON3 when the magnitude of the voltage of the second output electrode 120 is equal to or larger than the magnitude of the reference voltage Vref. The comparator 210 may disable the third control signal CON3 when the magnitude of the voltage of the second output electrode 120 is smaller than the magnitude of the reference voltage Vref.

The first switch 220 may be connected between the power supply voltage VDD and the comparator 210. The first switch 220 may selectively provide the power supply voltage VDD to the comparator 210 by being turned on or being turned off in response to the second control signal CON2. For example, the first switch 220 may be turned on to provide the power supply voltage VDD to the comparator 210 when the second control signal CON2 is enabled, and be turned off to stop providing the power supply voltage VDD to the comparator 210 when the second control signal CON2 is disabled. Therefore, the short detection unit 200a may operate only when the second control signal CON2 is enabled, to provide the third control signal CON3 (which is enabled or disabled based on a comparison result of the magnitude of the voltage of the second output electrode 120 and the magnitude of the reference voltage Vref) to the voltage conversion unit 100a.

The control unit 130 may include a timing generator 131 that controls a length of the short detection period. For example, if the wiring connected to the first output electrode 110 and the wiring connected to the second output electrode 120 are shorted with each other, the magnitude of the voltage of the second output electrode 120 increases according to an increase of the magnitude of the first driving voltage DV1. Therefore, as the length of the short detection period increases, the power converter 10a may be able to detect a more minute, short between the wiring connected to the first output electrode 110 and the wiring, connected to the second output electrode 120, and thus stop generating the first driving voltage DV1 and the second driving voltage DV2.

Figure 4:
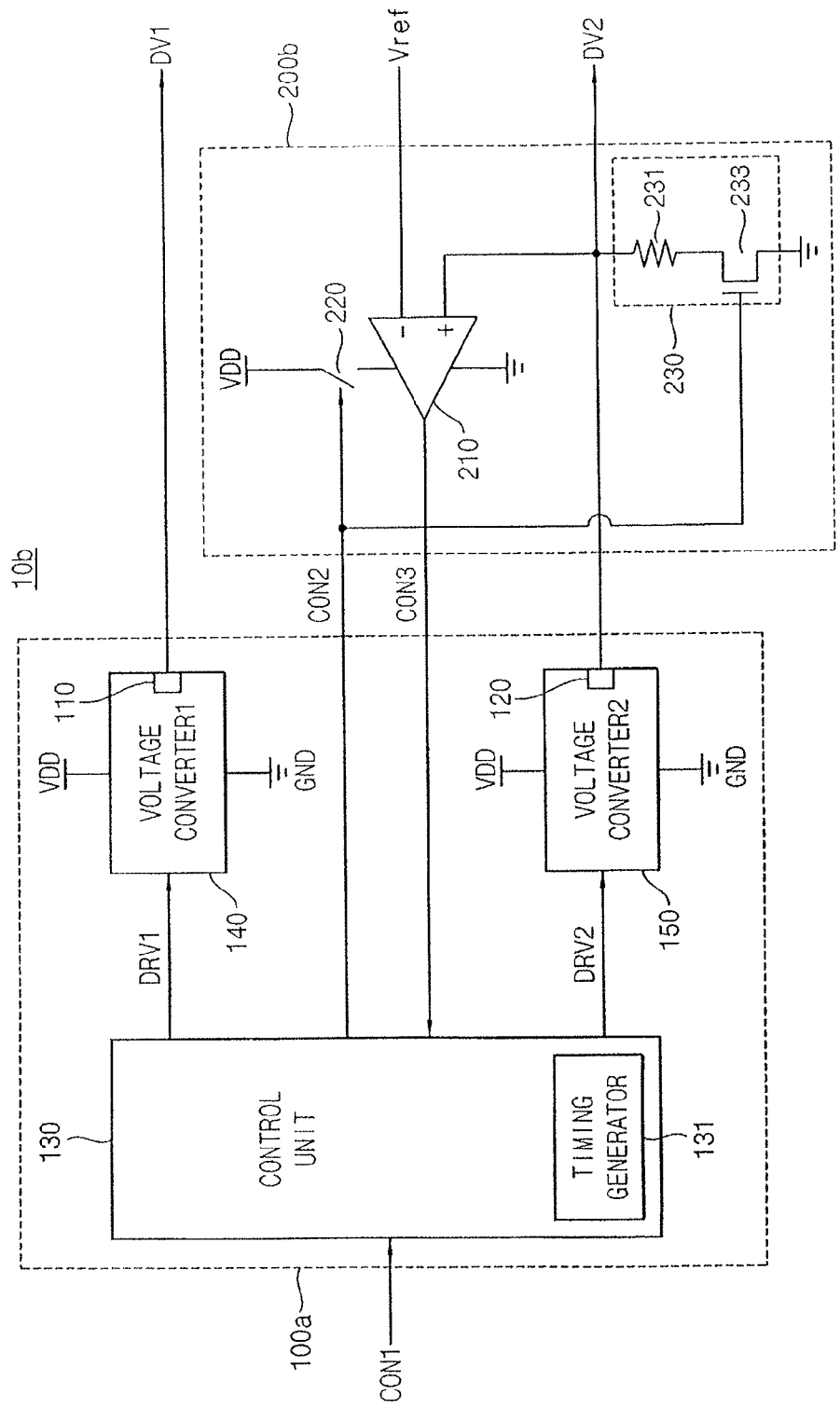

FIG. 4 illustrates a block diagram of an example of the power converter 10 of FIG. 1.

In the example embodiment shown in FIG. 4, a power converter 10L includes a voltage conversion unit 100a and a short detection unit 200b.

The power converter 10b of FIG. 4 has the same structure as the power converter 10a of FIG. 3, except that the short detection unit 200b of the power converter 10b further includes a pull-down unit 230. Thus, duplicated descriptions will be omitted.

Relative to the short detection unit 200a included in the power converter 10a of FIG. 3, the short detection unit 20013 may further include the pull-down unit 230. The pull-down unit 230 may be connected between the second output electrode 120 and a ground voltage GND. The pull-down unit 230 may be turned on in response to the second control signal CON2.

The pull-down unit 230 may include a pull-down resistor 231 and a second switch 233. A first terminal of the pull-down resistor 231 may be connected to the second output electrode 120. The second switch 233 may be connected between a second terminal of the pull-down resistor 231 and the ground voltage GND. The second switch 233 may be turned on when the second control signal CON2 is enabled, and may be turned off when the second control signal CON2 is disabled. For example, the second switch 233 may include an n-type metal oxide NMOS) transistor that has a drain connected to the second terminal of the pull-down resistor 231, a source connected to the ground voltage GND, and a gate receiving the second control signal CON2.

In the power converter 10a of FIG. 3, the second output electrode 120 may be floated during the short detection period since the voltage conversion unit 100a outputs the first driving voltage DV1 at the first output electrode 110 and does not output the second driving voltage DV2 at the second output electrode 120 during the short detection period. However, in the power converter 10b of FIG. 4, since the pull-down unit 230 connects the second output electrode 120 to the ground voltage GND through the pull-down resistor 231 during the short detection period, the power converter 10b may more effectively determine whether the magnitude of the voltage of the second output electrode 120 increases according to the increase of the magnitude of the first driving voltage DV1 during the short detection period.

The second switch 233 may be turned off to separate the second output electrode 120 from the ground voltage GND after the short detection period since the voltage conversion unit 100a may perform a normal operation (i.e., in which the voltage conversion unit 100a simultaneously generates the first driving voltage DV1 at the first output electrode 110 and the second driving voltage DV2 at the second output electrode 120) after the short detection period.

In some example embodiments, the pull-down resistor 231 may be a discharge resistor that is used for discharging a capacitor (not illustrated) connected between the first output electrode 110 and the ground voltage GND or a capacitor (not illustrated connected between the second output electrode 120 and the ground voltage GND when the voltage conversion unit 100a is shut down. In this case, the pull-down unit 230 may be embodied without a separate resistor.

Figure 5:
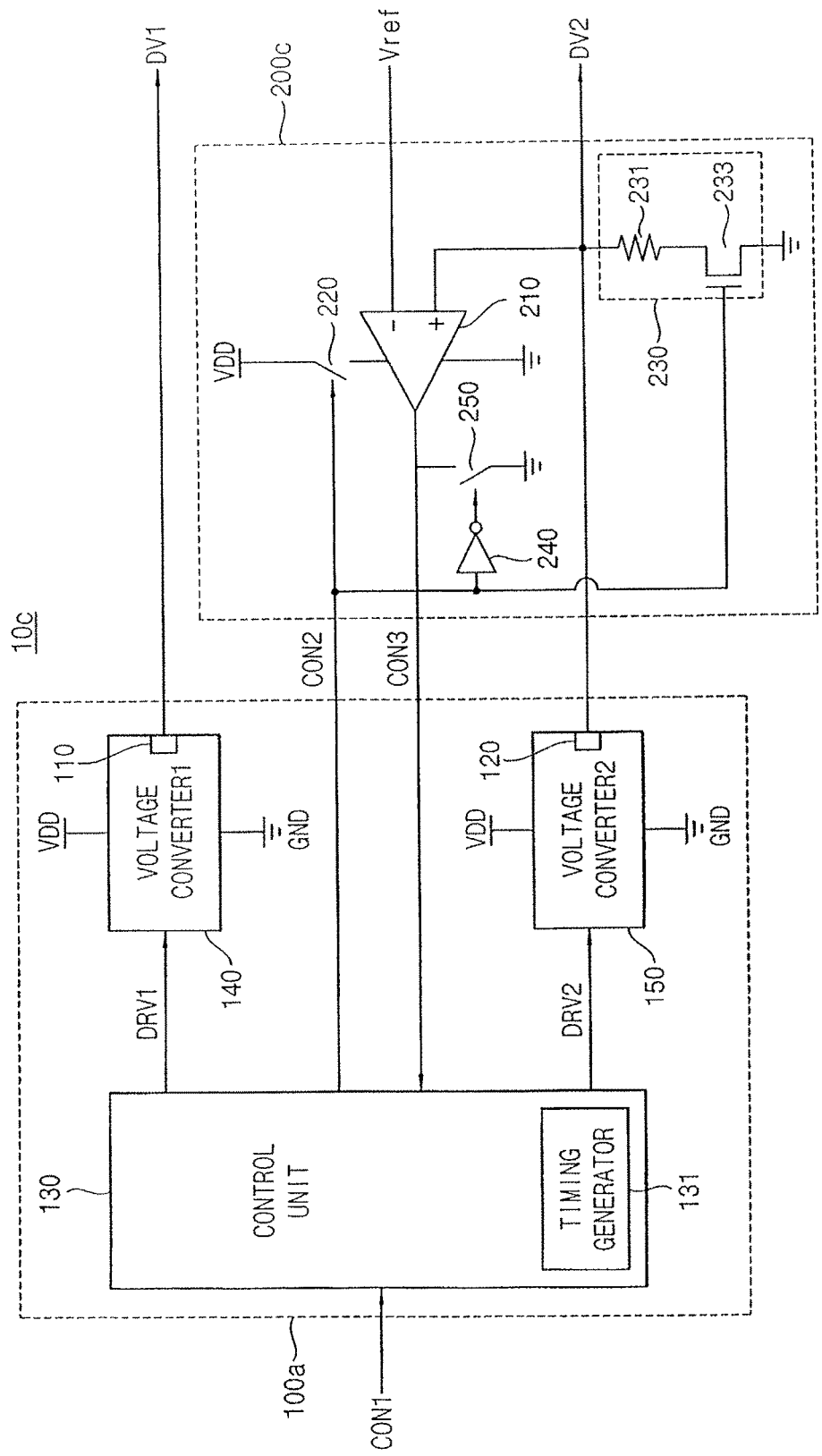

FIG. 5 illustrates a block diagram of an example of the power converter 10 of FIG. 1.

In the example embodiment shown in FIG. 5, a power converter 10c includes a voltage conversion unit 100a and a short detection unit 200c.

The power converter 10c of FIG. 5 has the same structure as the power converter 10b of FIG. 4, except that the short detection unit 200c of the power converter 10c further includes an inverter 240 and a third switch 250. Thus, duplicated descriptions will be omitted.

Relative to the short detection unit 200b included in the power converter 10b of FIG. 4, the short detection unit 200e may further include the inverter 240 and the third switch 250.

The inverter 240 may generate an inverted control signal by inverting the second control signal CON2.

The third switch 250 may be connected between an output electrode of the comparator 210 and the ground voltage GND. The third switch 250 may be turned on in response to the inverted control signal. For example, the third switch 250 may be turned off to separate the output electrode of the comparator 210 from the ground voltage GND when the inverted control signal is disabled, and may be turned on to disable the third control signal CON3 when the inverted control signal is enabled. That is, the third switch 250 may be turned off during the short detection period to let the third control signal CON3 outputted from the comparator 210 to be provided to the voltage conversion unit 100a, and be turned on after the short detection period to disable the third control signal CON3.

In the power converter 10a of FIG. 3 and the power converter 10b of FIG. 4 the output electrode of the comparator 210 may be floated after the short detection period since the first switch 220 is turned off to stop providing the power supply voltage VDD to the comparator 210 after the short detection period. However, in the power converter 10c of FIG. 5, since the inverter 240 and the third switch 250 connects the output electrode of the comparator 210 to the ground voltage GND to keep the third control signal CON3 disabled after the short detection period, the power converter 10c may be prevented from shutting down by the third control signal CON3 having a logic high level after the short detection period.

Figure 6:
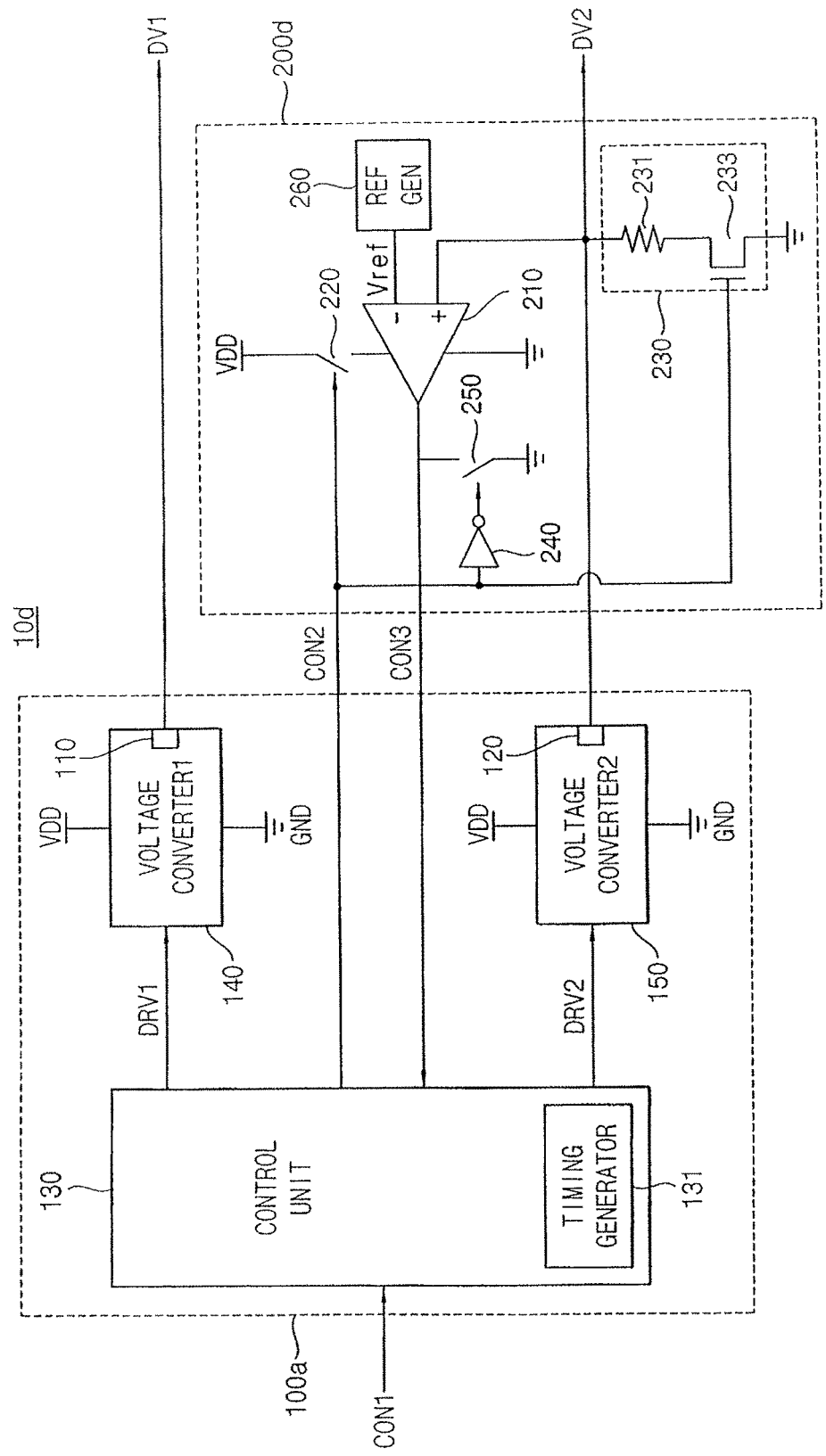

FIG. 6 illustrates a block diagram of an example of the power converter 10 of FIG. 1.

In the example embodiment shown in FIG. 6, a power converter 10d includes a voltage conversion unit 100a and a short detection unit 200c1.

The power converter 10d of FIG. 6 has the same structure as the power converter 10c of FIG. 5, except that the short detection unit 200d of the power converter 10d further includes a reference voltage generator REFGEN 260. Thus, duplicated descriptions will be omitted.

Relative to the short detection unit 200c included in the power converter 10c of FIG. 5, the short detection unit 200d may further include the reference voltage generator 260.

The reference voltage generator 260 may generate the reference voltage Vref and provide the reference voltage Vref to the comparator 210.

While the power converter 10a of FIG. 3, the power converter 10h of FIG. 4, and the power converter 10c of FIG. 5 receive the reference voltage Vref from outside, the power converter 10d of FIG. 6 may generate the reference voltage Vref for itself. If the wiring connected to the first output electrode 110 and the wiring connected to the second output electrode 120 are minutely shorted with each other, the magnitude of the voltage of the second output electrode 120 may increase relatively slowly according to the increase of the magnitude of the first driving voltage DV1. Therefore, as the magnitude of the reference voltage Vref decreases, the power converter 10d may be able to detect a more minute short between the wiring connected to the first output electrode 110 and the wiring connected to the second output electrode 120 to stop generating the first driving voltage DV1 and the second driving voltage DV2.

Figure 7:
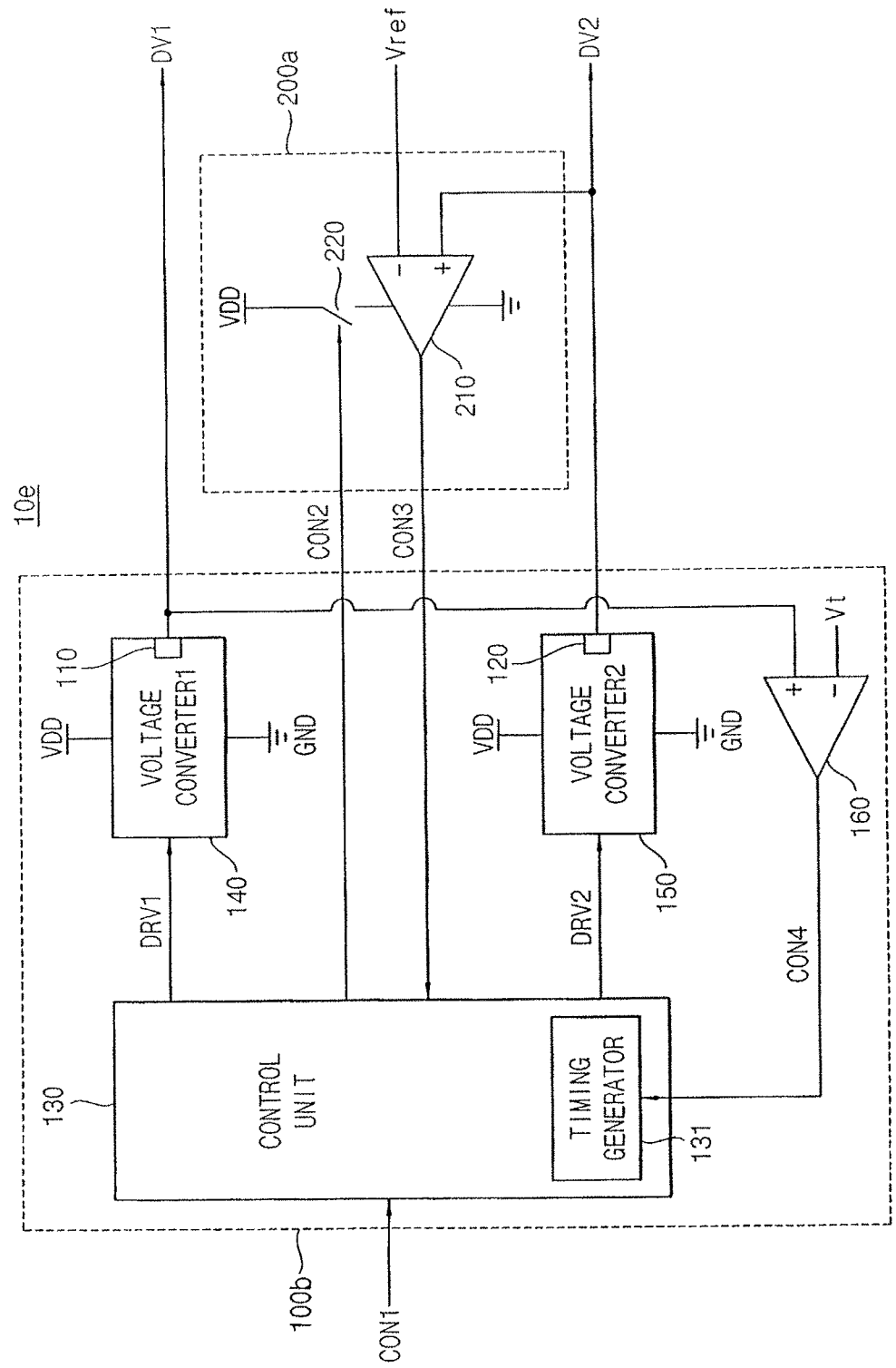

FIG. 7 illustrates a block diagram of an example of the power converter 10 of FIG. 1.

In the example embodiment shown in FIG. 7, a power converter 10e includes a voltage conversion unit 100b and a short detection unit 200a.

The power converter 10e of FIG. 7 has the same structure as the power converter 10a of FIG. 3, except that the voltage conversion unit 100b of the power converter 10e further includes a comparator 160. Thus, duplicated descriptions will be omitted.

Relative to the vane conversion unit 100a included in the power converter 10a of FIG. 3, the voltage conversion unit 100h may further include the comparator 160. The comparator 160 may provide a disabled fourth control signal CON4 to the timing generator 131 when a magnitude of the first driving voltage DV1 is smaller than a magnitude of a target voltage Vt and provide an enabled fourth control signal CON4 to the timing generator 131 when the magnitude of the first driving voltage DV1 is equal to or larger than the magnitude of the target voltage Vt. The timing generator 131 may control the length of the short detection period based on a length of a time period from a time when the first control signal CON1 is enabled to a time when the fourth control signal CON4 is enabled.

The magnitude of the target voltage Vt may be predetermined as a target magnitude of the first driving voltage DV1 when the first driving voltage DV1 is completely boosted. In this case, the length of the time period from the time when the first control signal CON1 is enabled to the time when the fourth control signal CON4 is enabled may be a boosting time, which is a time period needed to boost the first driving voltage DV1 to the target voltage Vt. The timing generator 131 may increase the length of the short detection period when the boosting time is relatively long and decrease the length of the short detection period when the boosting time is relatively short. Therefore, the voltage conversion unit 100b may sense the boosting time and optimize the length of the short detection period based on the sensed boosting time so that the power converter 10e may generate the second driving voltage DV2 in an optimized time after the first control signal CON1 is enabled.

In some example embodiments, the first driving voltage DV1 may have a positive potential and the second driving voltage DV2 may have a negative potential. In this case, the voltage of the second output electrode 120 may increase positively according to a positive increase of the first driving voltage DV1 when the wiring connected to the first output electrode 110 and the wiring connected to the second output electrode 120 are shorted with each other. Therefore, the reference voltage Vref may have a positive potential.

In other example embodiments, the first driving voltage DV1 may have a negative potential and the second driving voltage DV2 may have a positive potential. In this case, the voltage of the second output electrode 120 may decrease according to a decrease of the first driving voltage DV1 when the wiring connected to the first output electrode 110 and the wiring connected to the second output electrode 120 are shorted with each other. Therefore, the reference voltage Vref may have a negative potential.

In still other example embodiments, both the first driving voltage DV1 and the second driving voltage DV2 may have a positive potential, or both the first driving voltage DV1 and the second driving voltage DV2 may have a negative potential.

FIGS. 8, 9, 10 and 11 illustrate timing diagrams for describing an operation of the power converter of FIG.

Figure 8:
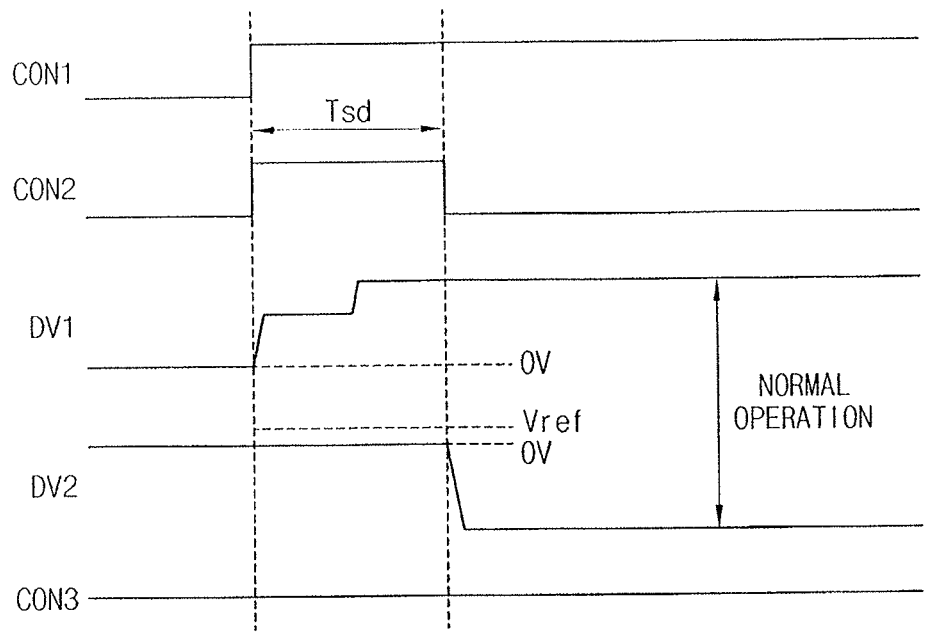
FIGS. 8, 9, 10 and 11 illustrate timing diagrams for describing an operation of the power converter of FIG. 1.

FIG. 8 represents a timing diagram when the first driving voltage DV1 has a positive potential, the second driving voltage DV2 has a negative potential, and the wiring connected to the first output electrode 110 and the wiring connected to the second output electrode 120 are not shorted with each other.

Referring to FIG. 8, the voltage conversion unit 100 provides the first driving voltage DV1 at the first output electrode 110 and enables the second control signal CON2 during the short detection period ("Tsd" in the timing diagram) when the first control signal CON1 received from the external device is enabled. Since the wiring connected to the first output electrode 110 and the wiring connected to the second output electrode 120 are not shorted with each other, the voltage DV2 of the second output electrode 120 does not increase according to an increase of the first driving voltage DV1 and is kept at the ground voltage GND, which is smaller than the magnitude of the reference voltage Vref, during the short detection period Tsd. Therefore, the short detection unit 200 disables the third control signal CON3 during the short detection period Tsd. The voltage conversion unit 100 disables the second control signal CON2 and provides the second driving voltage DV2 at the second output electrode 120 by converting the power supply voltage VDD after the short detection period Tsd, so that the voltage conversion unit 100 performs a normal operation after the short detection period Tsd.

Figure 9:
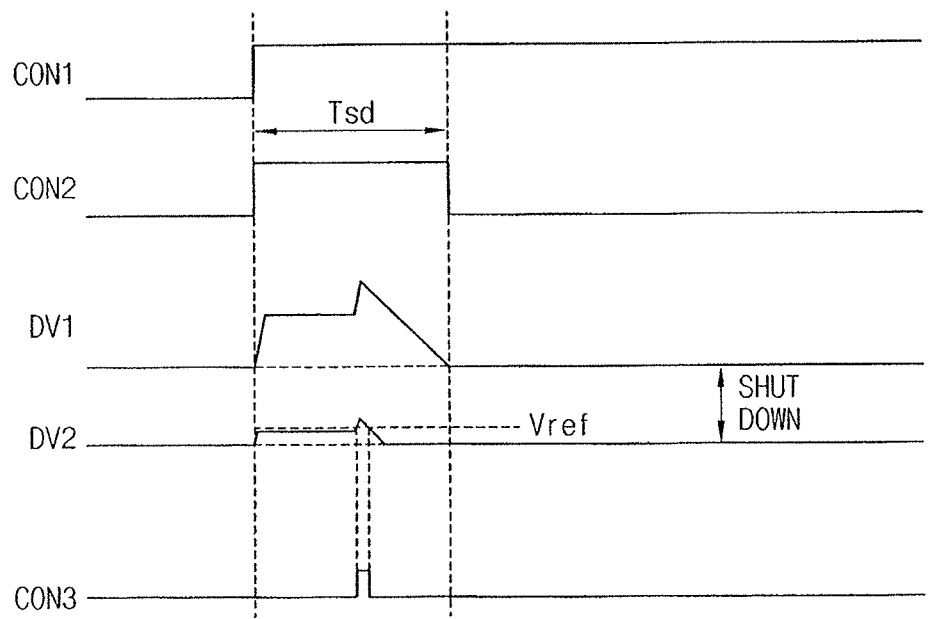

FIG. 9 represents a timing diagram when the first driving voltage DV1 has a positive potential, the second driving voltage DV2 has a negative potential, and the wiring connected to the first output electrode 110 and the wiring connected to the second output electrode 120 are shorted with each other.

Referring to FIG. 9, the voltage conversion unit 100 provides the first driving voltage DV1 at the first output electrode 110 and enables the second control signal CON2 during the short detection period Tsd when the first control signal CON1 received from the external device is enabled. Since the wiring connected to the first output electrode 110 and the wiring connected to the second output electrode 120 are shorted with each other, the voltage DV2 of the second output electrode 120 increases according to the increase of the first driving voltage DV1 during the short detection period Tsd. When the magnitude of the voltage DV2 of the second output electrode 120 increases over the magnitude of the reference voltage Vref during the short detection period Tsd, the short detection unit 200 enables the third control signal CON3. As illustrated in FIG. 9, when the third control signal CON3 is enabled, the voltage conversion unit 100 stops generating the first driving voltage DV1 and a magnitude of the first driving voltage DV1 decreases to the ground voltage GND. According to the decrease of the first driving voltage DV1, the voltage DV2 of the second output electrode 120 also decreases to the ground voltage GND, so that the power converter 10 shuts down.

Figure 10:
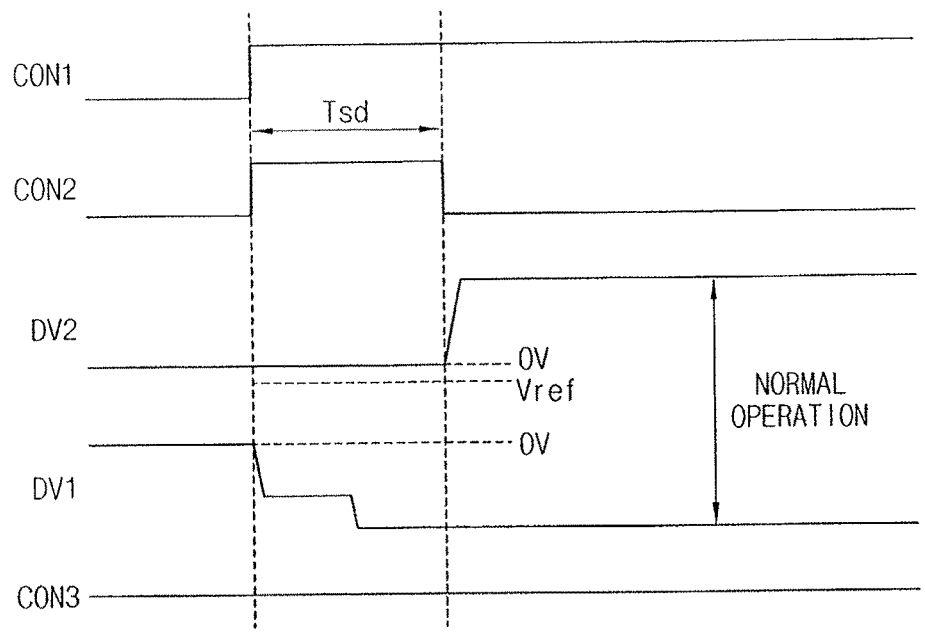

FIG. 10 represents a timing diagram when the first driving voltage DV1 has a negative potential, the second driving voltage DV2 has a positive potential, and the wiring connected to the first output electrode 110 and the wiring connected to the second output electrode 120 are not shorted with each other.

Referring to FIG. 10, the voltage conversion unit 100 provides the first driving voltage DV1 at the first output electrode 110 and enables the second control signal CON2 during the short detection period Tsd when the first control signal CON1 received from the external device is enabled. Since the wiring connected to the first output electrode 110 and the wiring connected to the second output electrode 120 are not shorted with each other, the voltage DV2 of the second output electrode 120 does not decrease according to a decrease of the first driving voltage DV1 and is kept at the ground voltage GND, which is smaller than the magnitude of the reference voltage Vref, during the short detection period Tsd. Therefore, the short detection unit 200 disables the third control signal CON3 during, the short detection period Tsd. The voltage conversion unit 100 disables the second control signal CON2 and provides the second driving voltage DV2 at the second output electrode 120 by converting the power supply voltage VDD after the short detection period Tsd, so that the voltage conversion unit 100 performs a normal operation after the short detection period Tsd.

Figure 11:
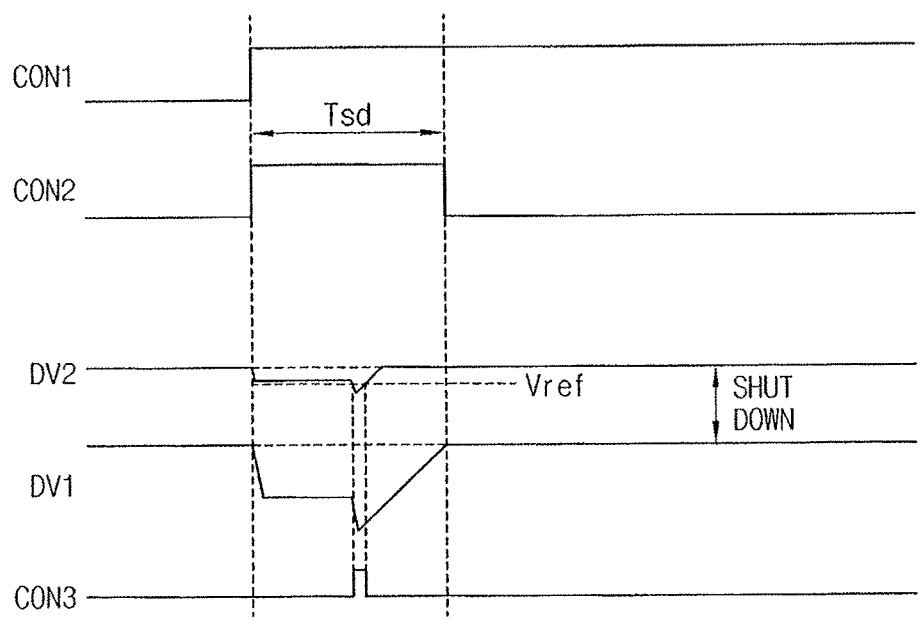

FIG. 11 represents a timing diagram when the first driving voltage DV1 has a negative potential, the second driving voltage DV2 has a positive potential, and the wiring connected to the first output electrode 110 and the wiring connected to the second output electrode 120 are shorted with each other.

Referring to FIG. 11, the voltage conversion unit 100 provides the first driving voltage DV1 at the first output electrode 110 and enables the second control signal CON2 during the short detection period Tsd when the first control signal CON1 received from the external device is enabled. Since the wiring connected to the first output electrode 110 and the wiring connected to the second output electrode 120 are shorted with each other, the voltage DV2 of the second output electrode 120 decreases according to the decrease of the first driving voltage DV1 during the short detection period Tsd. When the magnitude of the voltage DV2 of the second output electrode 120 increases over the magnitude of the reference voltage Vref during the short detection period Tsd, the short detection unit 200 enables the third control signal CON3. As illustrated in FIG. 11, when the third control signal CON3 is enabled, the voltage conversion unit 100 stops generating the first driving voltage DV1 and a magnitude of the first driving voltage DV1 decreases to the ground voltage GND. According to the decrease of the magnitude of the first driving voltage DV1, the magnitude of the voltage DV2 of the second output electrode 120 also decreases to the ground voltage GND, so that the power converter to shuts down.

By way of comparison to the example embodiments described above, a general power converter design may sense a current flowing through an output electrode of the power converter and shut down only when an overcurrent, which is larger than a threshold current, flows through the output electrode due to a short occurring between output electrodes. In such a case, however, if the short between the output electrodes were minute, such that a current flowing through the output electrode were smaller than the threshold current, then such a power converter design may not be effective to detect the minute short. Furthermore, if a power converter were to fail to detect the minute short and continue to operate even though the minute short occurred, an overheating problem and/or a fire could result. In contrast, the example embodiments described above may circumvent such a situation.

For example, the power converter 10 may supply the first driving voltage DV1 at the first output electrode 110 and the second driving voltage DV2 at the second output electrode 120 at a time interval of the short detection period. The power converter 10 may determine whether the magnitude of the voltage of the second output electrode 120 increases according to an increase of the magnitude of the first driving voltage DV1 during the short detection period. If the magnitude of the voltage of the second output electrode 120 increases over the magnitude of the reference voltage Vref during the short detection period, the power converter 10 may determine that the wiring connected to the first output electrode 110 and the wiring connected to the second output electrode 120 are shorted with each other and stop generating the first driving voltage DV1 and the second driving voltage DV2. Therefore, the power converter 10 may detect a minute short between the wiring connected to the first output electrode 110 and the wiring connected to the second output electrode 120 effectively.

Figure 12:
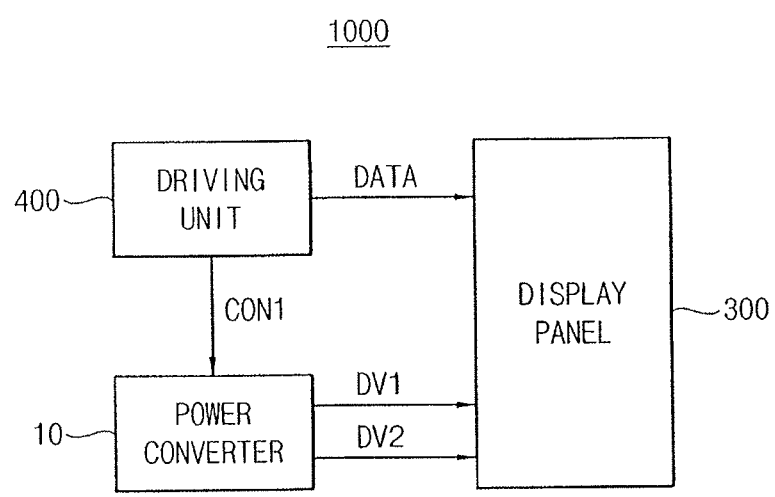
FIG. 12 illustrates a block diagram of a display device including a power converter according to example embodiments.

FIG. 12 illustrates a block diagram of a display device including a power converter according to example embodiments.

In the example embodiment shown in FIG. 12, a display device 1000 includes a display panel 300, the power converter 10, and a driving unit 400.

The display panel 300 may include a plurality of pixels, each pixel operating in response to a first driving voltage DV1, a second driving voltage DV2, and a data signal DATA.

The power converter 10 may provide the first driving voltage DV1 at a first output electrode of the power converter 10 and the second driving voltage DV2 at a second output electrode of the power converter 10 at a time interval of a short detection period in response to a first control signal CON1. The power converter 10 may shut down to stop generating the first driving voltage DV1 and the second driving voltage DV2 when a magnitude of a voltage of the second output electrode is equal to or larger than a magnitude of a reference voltage during the short detection period.

The power converter 10 included in the display device 1000 of FIG. 12 may have the same structure as the power converter 10 of FIG. 1. A structure and an operation of the power converter 10 of FIG. 1 are described above with reference to FIGS. 1 to 11. Thus, details of the power converter 10 included in the display device 1000 will not be repeated.

The driving unit 400 may provide the data signal DATA to the display panel 300 and may provide the first control signal CON1 to the power converter 10.

The display device 1000 may be implemented using various kinds of a display panel in so far as the display panel 300 displays an image using at least two driving voltages DV1 and DV2 received from the power converter 10. For example, the display device 1000 may include an organic light emitting display device. In this case, each of the plurality of pixels included in the display panel 300 includes an organic light emitting diode (OLED).

Hereinafter, an organic light emitting display device including the power converter according to example embodiments will be described.

Figure 13:
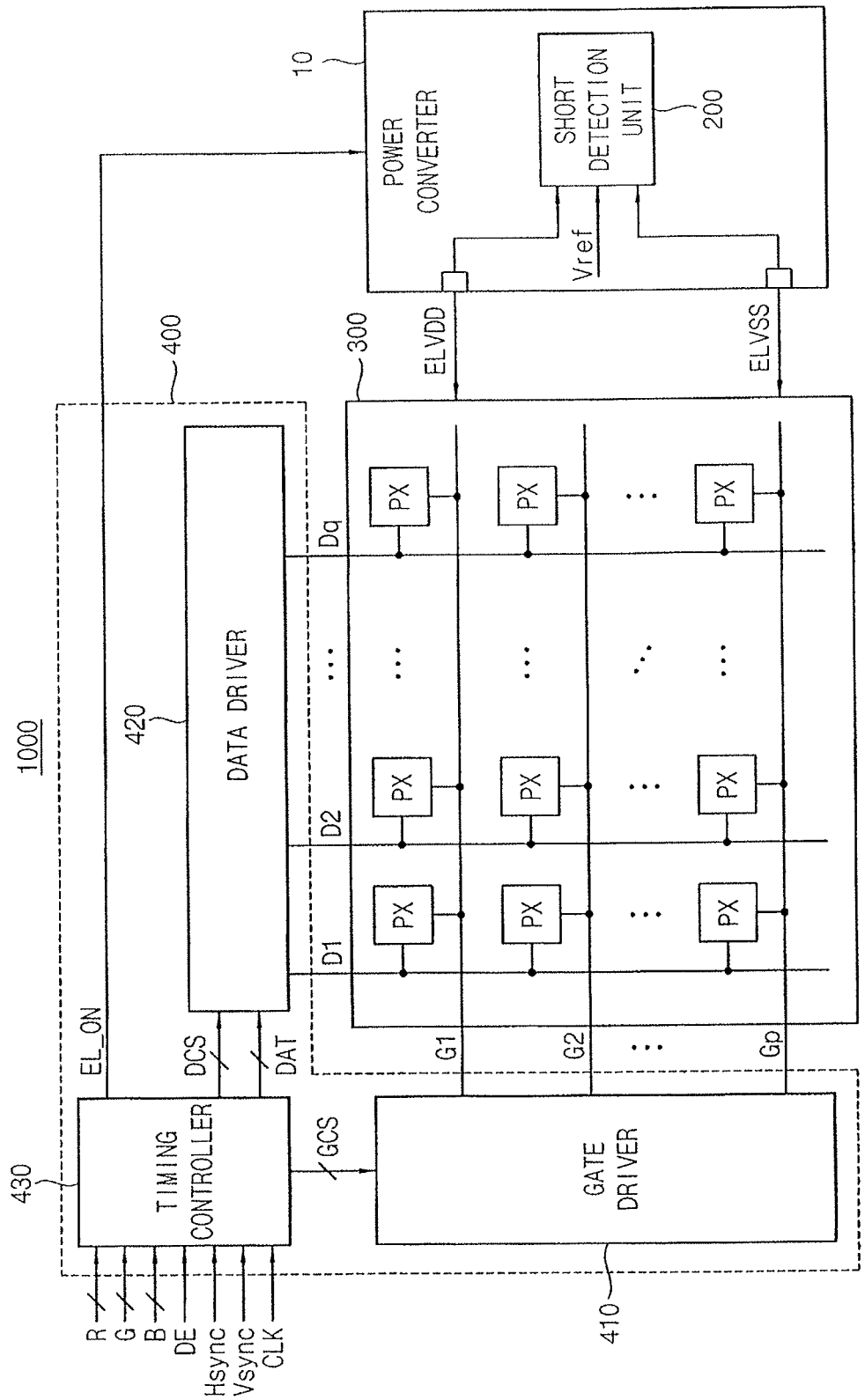
FIG. 13 illustrates a block diagram of an example of a display device of FIG. 12.

FIG. 13 illustrates a block diagram of an example of a display device of FIG. 12.

A display device 1000 of FIG. 13 is an organic light emitting display device.

In the example embodiment shown in FIG. 13, the display device 1000 includes a display panel 300, the power converter 10, and a driving unit 400.

The display panel 300 may include a plurality of pixels PX arranged in a matrix form. The plurality of pixels PX may be connected to a plurality of gate lines G1, G2, . . . , Gp and to a plurality of data lines D1, D2, . . . , Dq, where p and q represent positive integers. Each of the plurality of pixels PX may operate in response to a positive driving voltage ELVDD, a negative driving voltage ELVSS, gate signal and a data signal DATA.

The driving unit 400 may include a gate driver 410, a data driver 420, and a timing controller 430.

The timing, controller 430 may receive RGB image signal R, G and B, a vertical synchronization signal Vsync, a horizontal synchronization signal lisp main clock signal CLK, and a data enable signal DE from an external graphic controller (not illustrated), and may generate an output image signal DAT, a data control signal DCS, a gate control signal GCS, and a first control signal EL_ON. The timing controller 430 may provide the gate control signal GCS to the gate driver 410, provide the output image signal DAT and the data control signal DCS to the data driver 420, and provide the first control signal EL_ON to the power converter 10. For example, the gate control signal GCS may include a vertical synchronization start signal, which controls a start of outputting the gate signal, a gate clock signal, which controls an output timing of the gate signal, and an output enable signal, which controls a duration of the gate signal. The data control signal DCS may include a horizontal synchronization start signal, which controls a start of outputting the data signal DATA, a data clock signal, which controls an output timing of the data signal DATA and a load signal.

The gate driver 410 may consecutively apply the gate signal to the gate lines G1, G2, . . . , Gp in response to the gate control signal GCS.

The data driver 420 may apply the data signal DATA to the data lines D1, D2, . . . , Dq in response to the data control signal DCS and the output image signal DAT.

The power converter 10 may provide the positive driving voltage ELVDD and the negative driving voltage ELVSS to the display panel 300 in response to the first control signal EL_ON received from the timing controller 430. The power converter 10 may output selected one of the driving voltages ELVDD and ELVSS at a first output electrode of the power converter 10, and output the other one of the driving voltages ELVDD and ELVSS at a second output electrode of the power converter 10 consecutively at a time interval of the short detection period. The power converter 10 may determine whether the magnitude of the voltage of the second output electrode increases over the magnitude of the reference voltage Vref during the short detection period. If the magnitude of the voltage of the second output electrode increases over the magnitude of the reference voltage Vref during the short detection period, the power converter 10 may shut down to stop generating the positive driving voltage ELVDD and the negative driving voltage ELVSS. If the magnitude of the voltage of the second output electrode is kept smaller than the magnitude of the reference voltage Vref during the short detection period, the power converter 10 may generate the other one of the driving voltages ELVDD and ELVSS after the short detection period, so that the power converter 10 may perform a normal operation after the short detection period.

The short detection period may correspond to N frame cycles of the display device 1000, where N is a positive integer. If a wiring connected to the first output electrode and a wiring connected to the second output electrode are shorted with each other, the magnitude of the voltage of the second output electrode increases according to crease of the magnitude of the selected one of the driving voltages ELVDD and ELVSS. Therefore, as the length of the short detection period increases, the power converter 10 may be able to detect a more minute short between the wiring connected to the first output electrode and the wiring connected to the second output electrode, and thus stop generating the positive driving voltage ELVDD and the negative driving voltage ELVSS.

In some example embodiments, the power converter 10 may provide the positive driving voltage ELVDD at first and provide the negative driving voltage ELVSS after the short detection period. In this case, the power converter 10 may sense a voltage of an output electrode through which the negative driving voltage ELVSS is outputted to determine whether to shut down or not. The first driving voltage DV1 and the second driving voltage DV2 in the display device 1000 of FIG. 12 may correspond to the positive driving voltage ELVDD and the negative driving voltage ELVSS, respectively.

In other example embodiments, the power converter 10 may provide the negative driving voltage ELVSS at first and provide the positive driving voltage ELVDD after the short detection period. In this case, the power converter 10 may sense a voltage of an output electrode through which the positive driving voltage ELVDD is outputted to determine whether to shut down or not. The first driving voltage DV1 and the second driving voltage DV2 in the display device 1000 of FIG. 12 may correspond to the negative driving voltage ELVSS and the positive driving voltage ELVDD, respectively.

The power converter 10 included in the display device 1000 of FIG. 13 may have the same structure as the power converter 10 of FIG. 1. A structure and an operation of the power converter 10 of FIG. 1 are described above with reference to FIGS. 1 to 11. Thus, a detailed description of the power converter 10 included in the display device 1000 of FIG. 13 will not be repeated.

Figure 14:
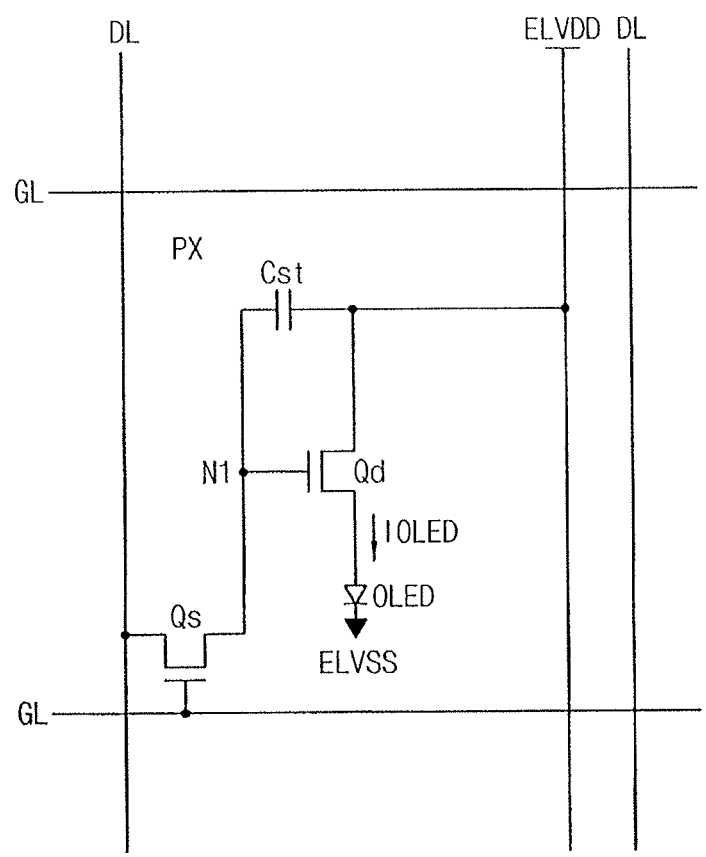
FIG. 14 illustrates a circuit diagram of an example of a pixel included in a display panel of a display device of FIG. 13.

FIG. 14 illustrates a circuit diagram of an example of a pixel included in a display panel of a display device of FIG. 13. The display panel may include a plurality of pixels.

Referring to FIG. 14, each of the plurality of pixels PX may include an organic light emitting diode (OLED), a driving transistor Qd, a switching transistor Qs, and a storage capacitor Cst.

The switching transistor Qs may be turned on in response to a gate signal received through a gate line GL and provide the data signal DATA received through a data line DL to a first node NI. The storage capacitor Cst may store the data signal DATA provided from the switching transistor Qs. The driving transistor Qd may be turned on in response to a voltage provided from the switching transistor Qs and/or the storage capacitor Cst, and flow a driving current IDLED corresponding to a magnitude of the data signal DATA. The driving current IDLED may flow from the positive driving voltage ELVDD to the negative driving voltage ELVSS through the driving transistor Qd and the organic light emitting diode (OLED). An intensity of a light emitted from the organic light emitting diode (OLED) may be determined by an intensity of the driving current IDLED.

The plurality of pixels PX may display an image in response to a positive driving voltage ELVDD, a negative driving voltage ELVSS, a gate signal provided through the gate line GL, and a data signal DATA provided through the data line DL. Thus, a wiring for the positive driving voltage (ELVDD), a wiring for the negative driving voltage (ELVSS), the gate line GL, and the data line DL may be formed to overlap on the display panel 300. Therefore, the wiring for the positive driving voltage (ELVDD), the wiring for the negative driving voltage (ELVSS), the gate line GL, and the data line DL may be easily shorted with each other by, e.g., a crack on the display panel and/or a foreign substance in the display panel 300.

As described above, the display device 1000 including the power converter 10 according to example embodiments may be able to detect minute short between wirings formed on the display panel 300 so that the display device 1000 stops operating.

Figure 15:
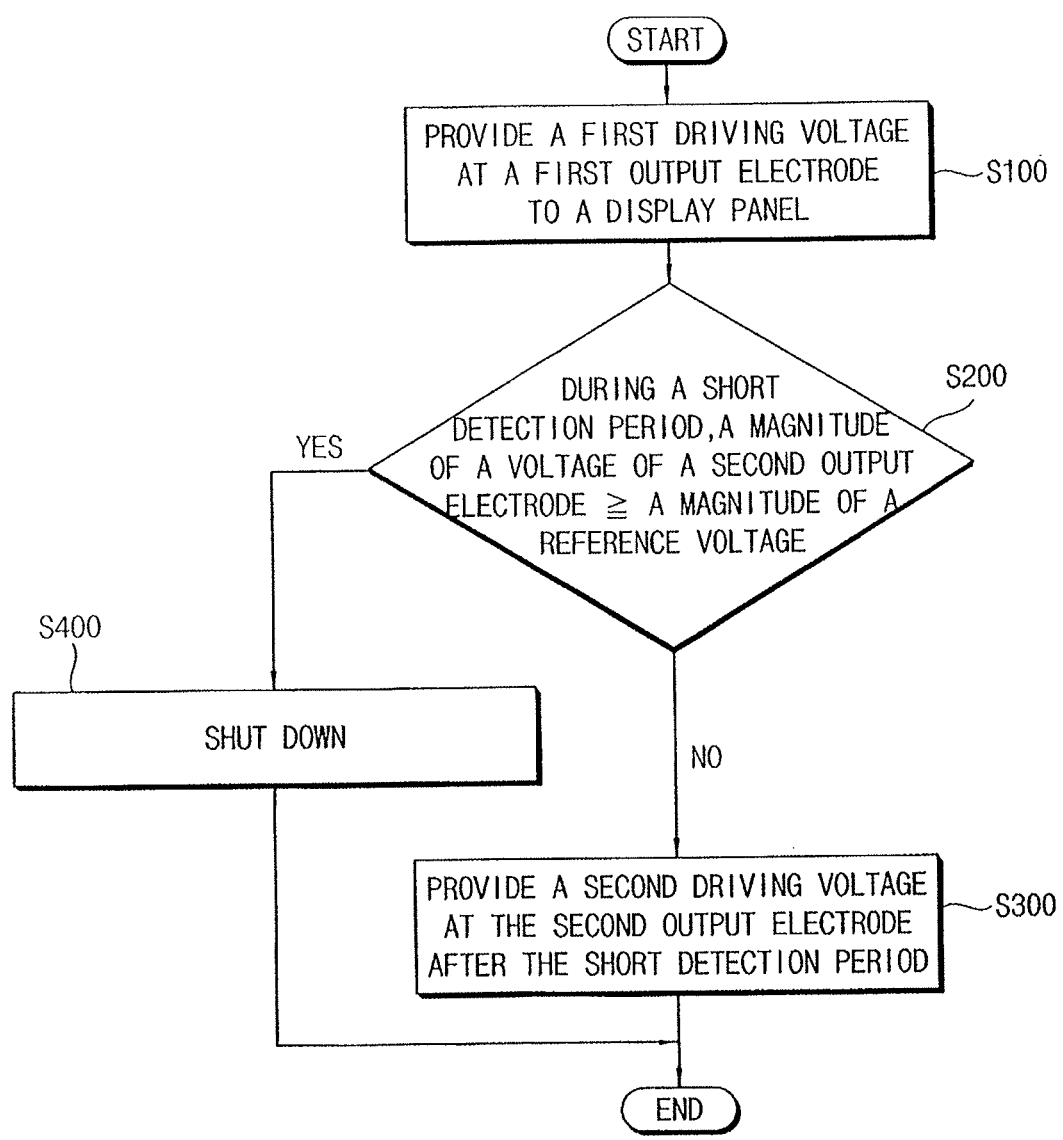
FIGS. 15, 16 and 17 illustrate flow charts of examples of methods of driving a display device of FIG. 12.

FIG. 15 illustrates a flow chart of an example of a method of driving a display device of FIG. 12.

Referring to FIG. 15, the power converter 10 may provide the first driving voltage DV1 at the first output electrode 110 to the display panel 300 (operation S100 in FIG. 15).

The power converter 10 may compare the magnitude of the voltage of the second output electrode 120 with the magnitude of the reference voltage Vref during the short detection period (operation S200).

With respect to the comparison described above in connection with operation S200, if the magnitude of the voltage of the second output electrode 120 is kept smaller than the magnitude of the reference voltage Vref during the short detection period, the power converter 10 may provide the second driving voltage DV2 at the second output electrode 120 after the short detection period, so that the display device 1000 may perform a normal operation after the short detection period (operation S300).

With farther respect to the comparison described above in connection with operation S200, if the magnitude of the voltage of the second output electrode 120 equals to or increases over the magnitude of the reference voltage Vref during the short detection period, the power converter 10 may determine that the wirings formed on the display panel 300 are shorted with each other and stop generating the first driving voltage DV1 and the second driving voltage DV2 (operation S400).

In some example embodiments, the first driving voltage DV1 may be the positive driving voltage ELVDD having a positive potential and the second driving voltage DV2 may be the negative driving voltage ELVSS having a negative potential.

In other example embodiments, the first driving voltage DV1 may be the negative driving voltage ELVSS having a negative potential and the second driving voltage DV2 may be the positive driving voltage ELVDD having a positive potential.

Figure 16:
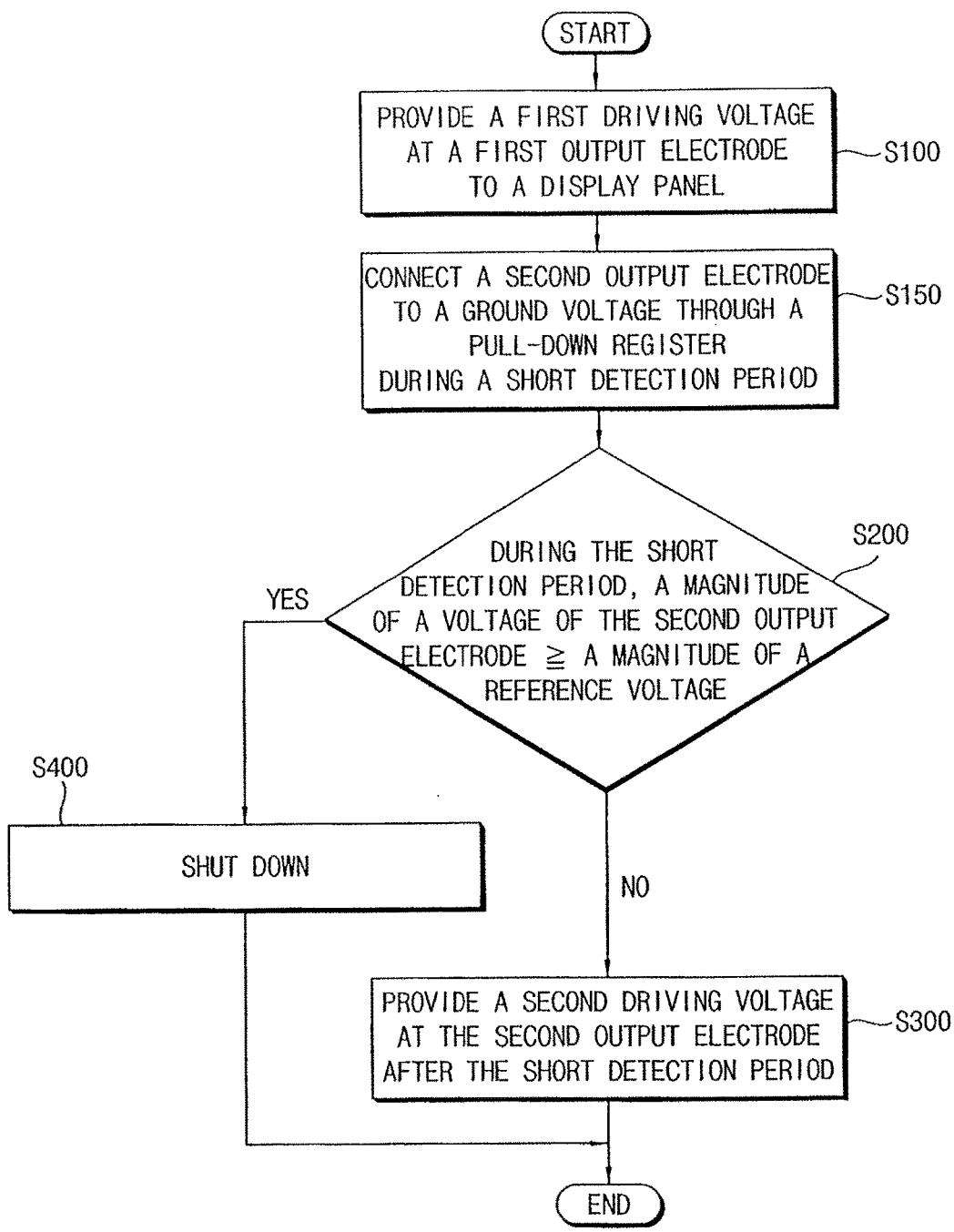

FIG. 16 illustrates a flow chart of an example of a method of driving a display device of FIG. 12.

Referring to FIG. 16, a method of driving the display device. 1000 according to FIG. 16 has the same steps as a method of driving the display device 1000 according to FIG. 15, except that the power converter 10 may connect the second output electrode 120 to the ground voltage GND through the pull-down resistor 231 during the short detection period (operation S150 in FIG. 16) before the power converter 10 determines whether the magnitude of the voltage of the second output electrode 120 increases over the magnitude of the reference voltage Vref during the short detection period (operation S200).

If the power converter 10 does not connect the second output electrode 120 to the ground voltage GND through the pull-down resistor 231 during the short detection period, the second output electrode 120 may be floated during the short detection period since the power converter 10 outputs the first driving voltage DV1 at the first output electrode 110 and does not outputs the second driving voltage DV2 at the second output electrode 120 during the short detection period. However, in the method of driving the display device 1000 according to FIG. 16, since the second output electrode 120 is connected to the ground voltage GND through the pull-down resistor 231 during the short detection period, the power converter 10 may more effectively determine whether the magnitude of the voltage of the second output electrode 120 increases according to the increase of the magnitude of the first driving voltage DV1 during the short detection period.

The power converter 10 may separate the second output electrode 120 from the ground voltage GND after the short detection period since the power converter 10 performs a normal operation, in which the power converter 10 simultaneously generates the first driving voltage DV1 at the first output electrode 110 and the second driving voltage DV2 at the second output electrode 120, after the short detection period.

Figure 17:
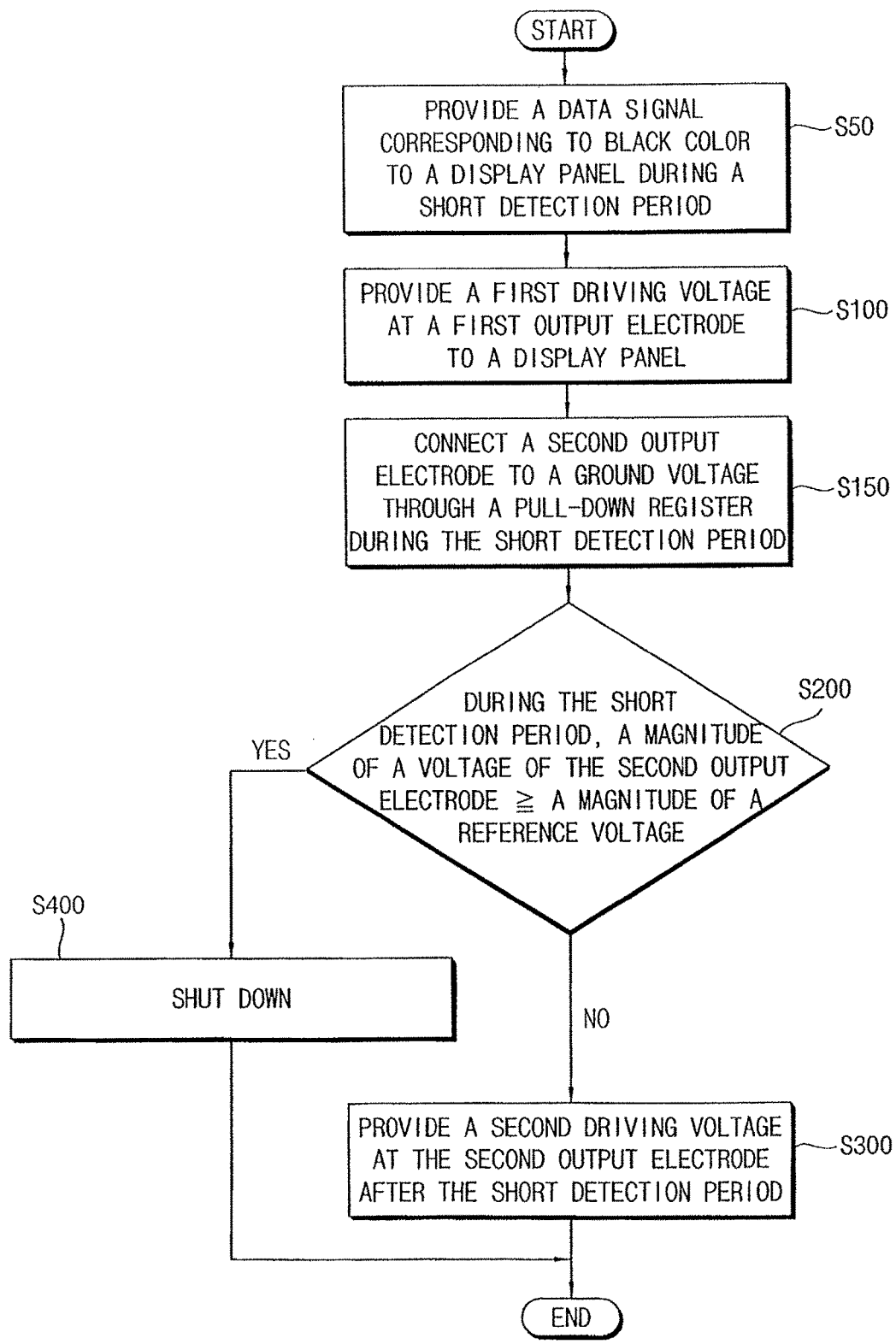

FIG. 17 illustrates a flow chart of an example of a method of driving a display device of FIG. 12.

Referring to FIG. 17, a method of driving the display device 1000 according to FIG. 17 has the same steps as a method of driving the display device 1000 according to FIG. 16, except that the driving unit 400 may provide the data signal DATA corresponding to black color to the display panel 300 during the short detection period (operation S50 in FIG. 17) before the power converter 10 provides the first driving voltage DV1 at the first output electrode 110 to the display panel 300 (operation S100).

As described with reference to FIGS. 13 and 14, the driving current IOLED corresponding to a magnitude of the data signal DATA may flow from the positive driving voltage ELVDD to the negative driving voltage ELVSS through the driving transistor Qd and the organic light emitting diode (PLED). The intensity of the driving current IOLED may be a maximum when the data signal DATA corresponding to white color is provided to the data line DL, and the intensity of the driving current IOLED may be substantially zero when the data signal DATA corresponding to black color is provided to the data line DL.

In the method of driving the display device 1000 according to FIG. 17, since the driving unit 400 provides the data signal DATA corresponding to black color to the display panel 300 during the short detection period to prevent the driving current from flowing from the positive driving voltage ELVDD to the negative driving voltage ELVSS, the power converter 10 may more effectively determine whether the magnitude of the voltage of the second output electrode 120 increases according to the increase of the magnitude of the first driving voltage DV1 during the short detection period.

If the magnitude of the voltage of the second output electrode 120 is kept smaller than the magnitude of the reference voltage Vref during the short detection period, the power converter 10 may start to generate the second driving voltage DV2 after the short detection period. Since it takes some time for the power converter 10 to boost the second driving voltage DV2 to a target voltage level, the driving unit 400 may provide the data signal DATA corresponding to black color to the display panel 300 for at least one frame cycle from the end of the short detection period and then provide a valid data signal DATA to the display panel 300.

In some example embodiments, the first driving voltage DV1 may be the positive driving voltage ELVDD having a positive potential and the second driving voltage DV2 may be the negative driving voltage ELVSS having a negative potential.

In other example embodiments, the first driving voltage DV1 may be the negative driving voltage ELVSS having a negative potential and the second driving voltage DV2 may be the positive driving voltage ELVDD having a positive potential.

Figure 18:
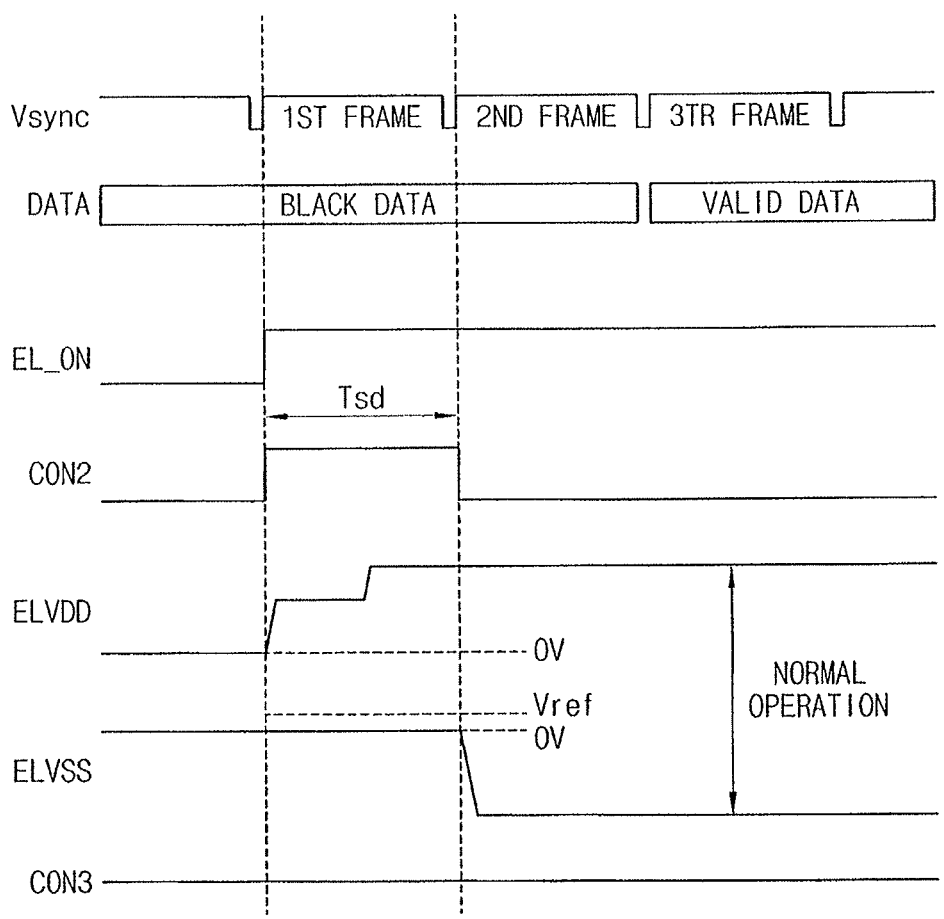
FIGS. 18, 19, 20 and 21 illustrate timing diagrams for describing an operation of the display device of FIG. 13.

FIG. 18 illustrates a timing diagram for describing an opera of the display device of FIG. 13.

FIG. 18 represents a timing diagram when the power converter 10 provides the positive driving voltage ELVDD at first and provides the negative driving voltage ELVSS after the short detection period, and the wirings formed on the display panel 300 are not shorted with each other.

In FIG. 18, the short detection period Tsd corresponds to one frame cycle of the display device 1000, and the driving unit 400 continuously provides the data signal DATA corresponding to black color to the display panel 300 during the short detection period Tsd and for one frame cycle from the end of the short detection period Tsd, before providing a valid data signal VALID DATA.

Hereinafter, an operation of the display device 1000 of FIG. 13 will be described with reference to FIGS. 1 to 17.

The driving unit 400 may provide the first control signal EL_ON to the voltage conversion unit 100 included in the power converter 10 in synchronization with the vertical synchronization signal Vsync while the driving unit 400 provides the data signal corresponding to black color BLACK DATA to the display panel 300. The voltage conversion unit 100 may provide the positive driving voltage ELVDD at the first output electrode 110 by converting a power supply voltage VDD and enable the second control signal CON2 during the short detection period Tsd in response to the first control signal EL_ON received from the driving unit 400. Since the wirings formed on the display panel 300 are not shorted with each other, the voltage ELVSS of the second output electrode 120 does not increase according to an increase of the positive driving voltage ELVDD and is kept at the ground voltage GND, which is smaller than the magnitude of the reference voltage Vref, during the short detection period Tsd. Therefore, the short detection unit 200 included in the power converter 10 disables the third control signal CON3 during the short detection period Tsd. The voltage conversion unit 100 disables the second control signal CON2 and provides the negative driving voltage ELVSS at the second output electrode 120 by converting the power supply voltage VDD after the short detection period Tsd, so that the power converter 10 performs a normal operation after the short detection period Tsd.

Figure 19:
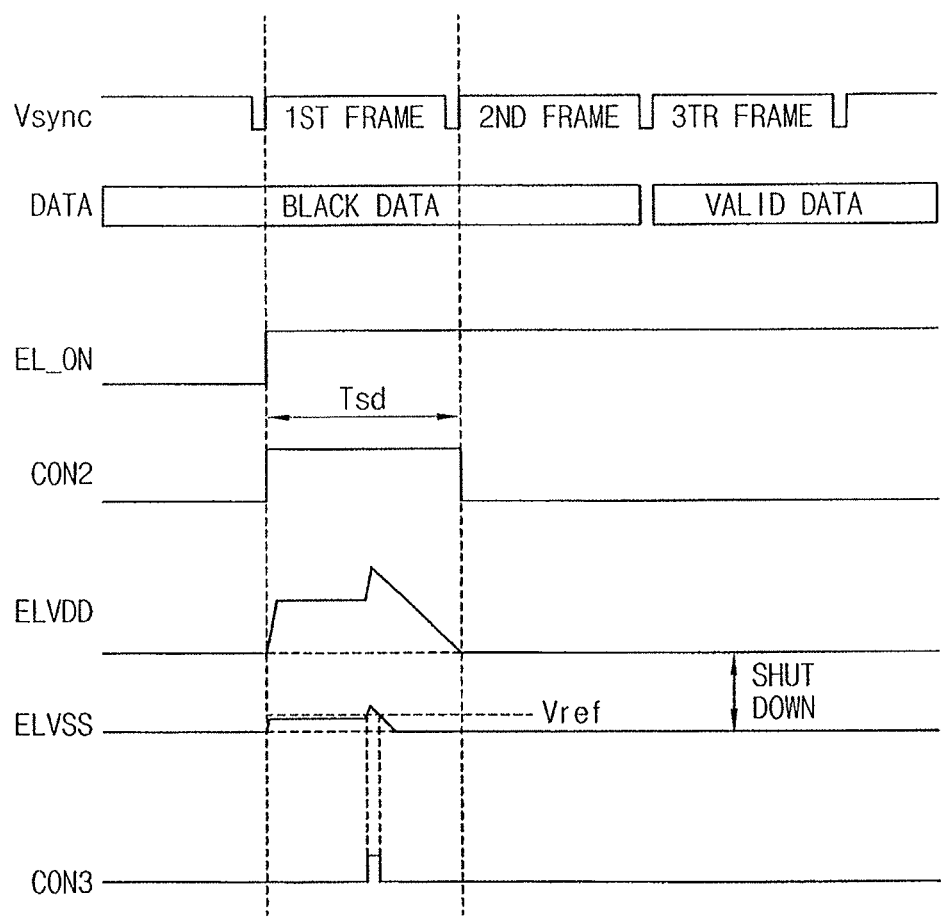

FIG. 19 illustrates a timing diagram for describing an operation of the display device of FIG. 13.

FIG. 19 represents a timing diagram when the power converter 10 provides the positive driving voltage ELVDD at first and provides the negative driving voltage ELVSS after the short detection period, and the wirings formed on the display panel 300 are shorted with each other.

In FIG. 19, the short detection period Tsd corresponds to one frame cycle of the display device 1000, and the driving unit 400 continuously provides the data signal DATA corresponding to black color to the display panel 300 during the short detection period Tsd and for one frame cycle from the end of the short detection period Tsd, before providing a valid data signal VALID DATA.

The driving unit 400 may provide the first control signal EL_ON to the voltage conversion unit 100 included in the power converter 10 in synchronization with the vertical synchronization signal Vsync while the driving unit 400 provides the data signal corresponding to black color BLACK DATA to the display panel 300. The voltage conversion unit 100 may provide the positive driving voltage ELVDD at the first output electrode 110 by converting a power supply voltage VDD and enable the second control signal CON2 during the short detection period Tsd response to the first control signal EL_ON received from the driving unit 400. Since the wirings formed on the display panel 300 are shorted with each other, the voltage ELVSS of the second output electrode 120 increases according to the increase a the positive driving voltage ELVDD during the short detection period Tsd. When the magnitude of the voltage ELVSS of the second output electrode 120 increases over the magnitude of the reference voltage Vref during the short detection period Tsd, the short detection unit 200 included in the power converter 10 enables the third control signal CON3. As illustrated in FIG. 19, when the third control signal CON3 is enabled, the voltage conversion unit 100 stops generating the positive driving voltage ELVDD and a magnitude of the positive driving voltage ELVDD decreases to the ground voltage GND. According to the decrease of the positive driving voltage ELVDD, the voltage ELVSS of the second output electrode 120 also decreases to the ground voltage GND, so that the power converter 10 shuts down.

Figure 20:
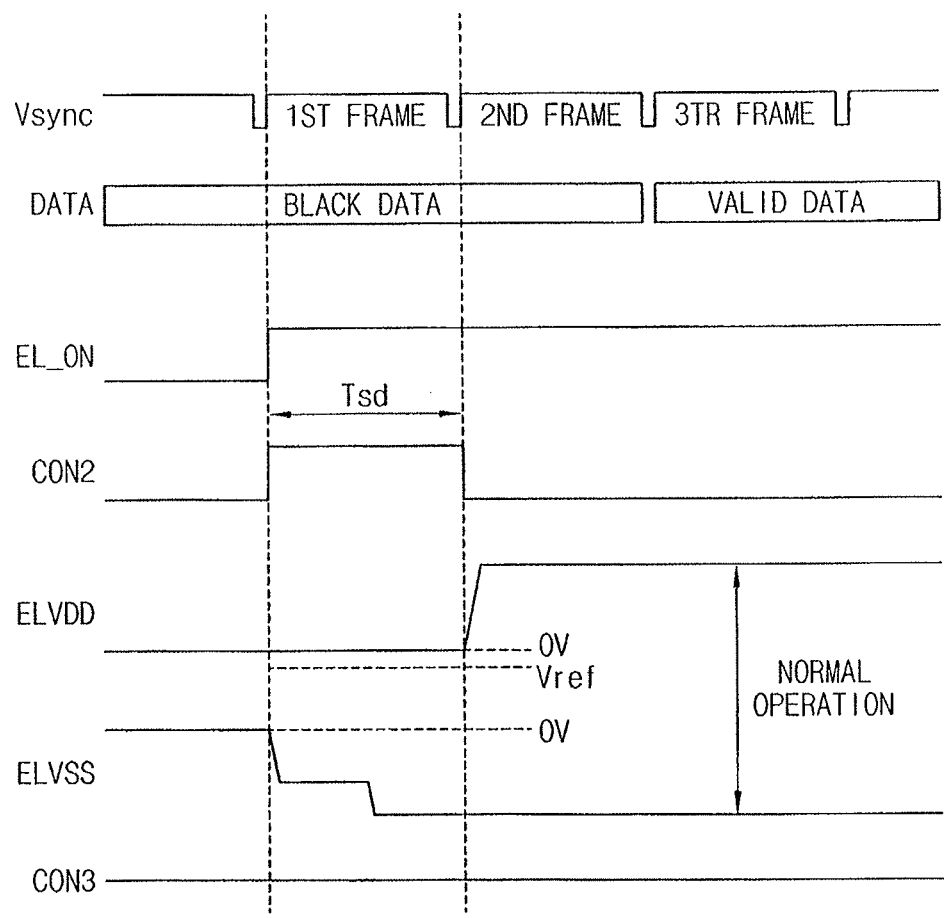

FIG. 20 illustrates a timing diagram for describing an operation of the display device of FIG. 13.

FIG. 20 represents a timing diagram when the power converter 10 provides the negative driving voltage ELVSS at first and provides the positive driving voltage ELVDD after the short detection period, and the wirings formed on the display panel 300 are not shorted with each other.

In FIG. 20, the short detection period Tsd corresponds to one frame cycle of the display device 1000, and the driving unit 400 continuously provides the data signal DATA corresponding to black color to the display panel 300 during the short detection period Tsd and for one frame cycle from the end of the short detection period Tsd, before providing a valid data signal VALID DATA.

The driving unit 400 may provide the first control signal EL_ON to the voltage conversion unit 100 included in the power converter 10 in synchronization with the vertical synchronization signal Vsync while the driving unit 400 provides the data signal corresponding to black color BLACK DATA to the display panel 300. The voltage conversion unit 100 may provide the negative driving voltage ELVSS at the first output electrode 110 by converting a power supply voltage VDD and enable the second control signal CON2 during the short detection period Tsd in response to the first control signal EL_ON received from the driving unit 400. Since the wirings formed on the display panel 300 are not shorted with each other, the voltage ELVDD of the second output electrode 120 does not decrease according to a decrease of the negative driving voltage ELVSS and is kept at the ground voltage GND, which is smaller than the magnitude of the reference voltage Vref, during the short detection period Tsd. Therefore, the short detection unit 200 included in the power converter 10 disables the third control signal CON3 during the short detection period Tsd. The voltage conversion unit 100 disables the second control signal CON2 and provides the positive driving voltage ELVDD at the second output electrode 120 by converting the power supply voltage VDD after the short detection period Tsd, so that the power converter 10 performs a normal operation after the short detection period Tsd.

Figure 21:
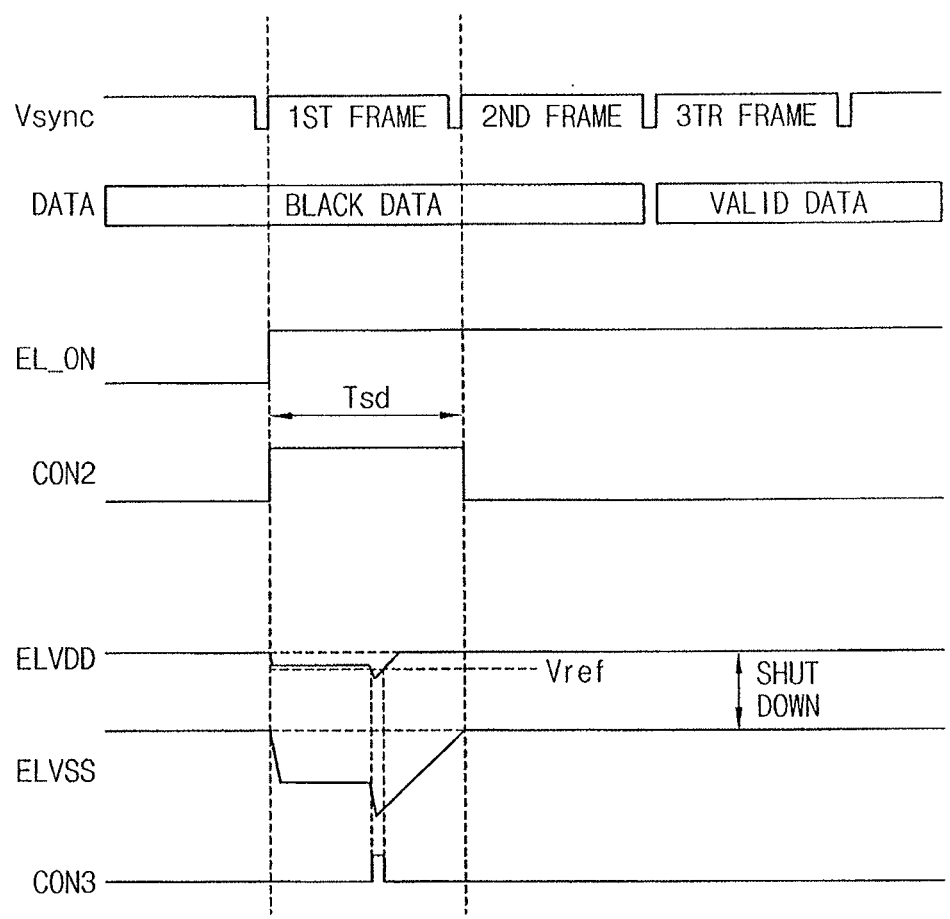

FIG. 21 illustrates a timing diagram for describing an operation of the display device of FIG. 13.

FIG. 21 represents a timing diagram when the power converter 10 provides the negative driving voltage ELVSS at first and provides the positive driving voltage ELVDD after the short detection period, and the wirings formed on the display panel 300 are shorted with each other.

In FIG. 21, the short detection period Tsd corresponds to one frame cycle of the display device 1000, and the driving unit 400 continuously provides the data signal DATA corresponding to black color to the display panel 300 during the short detection period Tsd and for one frame cycle from the end of the short detection period Tsd, before providing a valid data signal VALID DATA.

The driving unit 400 may provide the first control signal EL_ON to the voltage conversion unit 100 included in the power converter 10 in synchronization with the vertical synchronization signal Vsync while the driving unit 400 provides the data signal corresponding to black color BLACK DATA to the display panel 300. The voltage conversion unit 100 may provide the negative driving voltage ELVSS at the first output electrode 110 by converting a power supply voltage VDD and enable the second control signal CON2 during the short detection period Tsd in response to the first control signal EL_ON received from the driving unit 400. Since the wirings formed on the display panel 300 are shorted with each other, the voltage ELVDD of the second output electrode 120 decreases according to the decrease (Ante negative driving voltage ELVSS during the short detection period Tsd. When the magnitude of the voltage ELVDD of the second output electrode 120 increases over the magnitude of the reference voltage Vref during the short detection period Tsd, the short detection unit 200 included in the power converter 10 enables the third control signal CON3. As illustrated in FIG. 21, when the third control signal CON3 is enabled, the voltage conversion unit 100 stops generating the negative driving voltage ELVSS and a magnitude of the negative driving voltage ELVSS decreases to the ground voltage GND. According to the decrease of the magnitude of the negative driving voltage ELVSS, the magnitude of the voltage ELVDD of the second output electrode 120 also decreases to the ground voltage GND, so that the power converter 10 shuts down.

As described above, the power converter 10 may provide the first driving voltage DV1 at the first output electrode 110 and the second driving voltage DV2 at the second output electrode 120 at a time interval of the short detection period while the driving unit 400 provides the data signal DATA corresponding to black color to the display panel 300. The power converter 10 may determine whether the magnitude of the voltage of the second output electrode 120 increases according to an increase of the magnitude of the first driving voltage DV1 during the short detection period. If the magnitude of the voltage of the second output electrode 120 increases over the magnitude of the reference voltage Vref during the short detection period, the power converter 10 may determine that the wirings formed on the display panel 300 are shorted with each other and stop generating the first driving voltage DV1 and the second driving voltage DV2. Therefore, the power converter 10 may detect a minute short between the wirings formed on the display panel 300 effectively.

Figure 22:
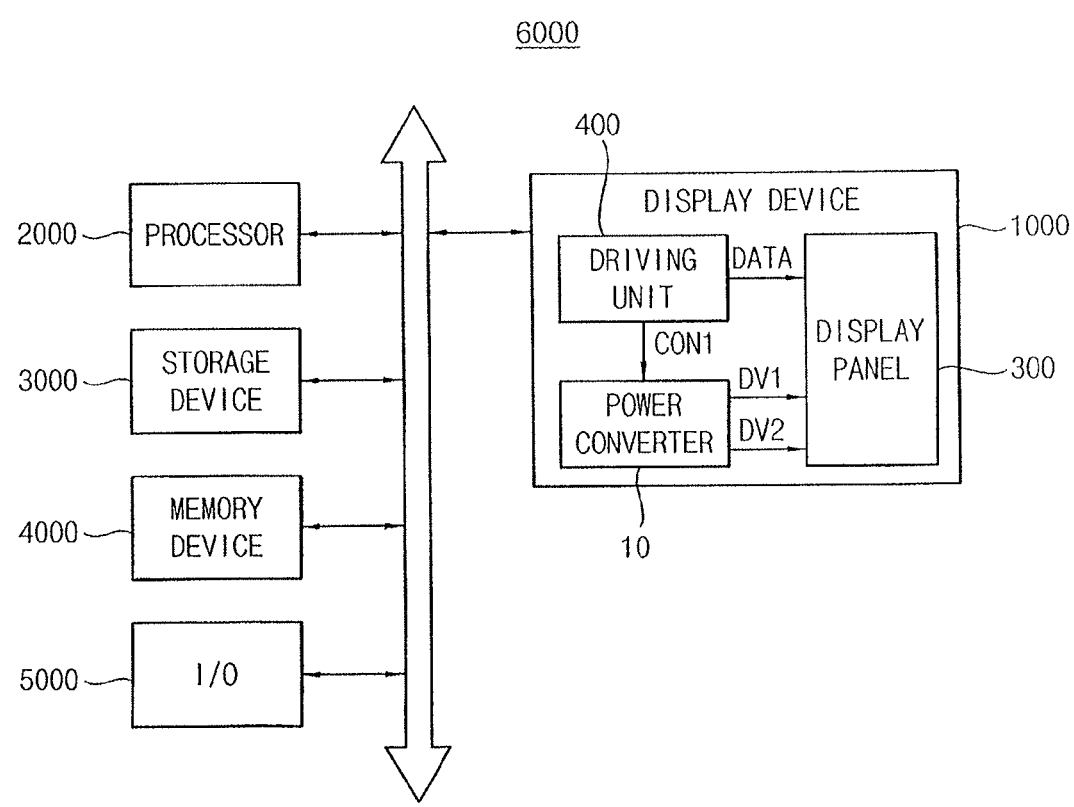
FIG. 22 illustrates a block diagram of a system including a display device according to example embodiments.

FIG. 22 illustrates a block diagram of a system including a display device according to example embodiments.

In the example embodiment shown in FIG. 22, a system 6000 includes the display device 1000, a processor 2000, a storage device 3000, a memory device 4000, and an I/O device 5000. The display device 1000 may include the display panel 300, the power converter 10, and the driving unit 400.

The storage device 3000 may store image data. The storage device 3000 may include a solid state drive (SSD) a hard disk drive (HDD), a CD-ROM, etc.

The display device 1000 may display the image data stored in the storage device 3000.

The display panel 300 may include a plurality of pixels, each of which operates in response to the first driving voltage DV1, the second driving voltage DV2, and the data signal DATA.

The power converter 10 may provide the first driving voltage DV1 at a first output electrode of the power converter 10 and the second driving voltage DV2 at a second output electrode of the power converter 10 at a time interval of a short detection period in response to a first control signal CON1. The power converter 10 may shut down to stop generating the first driving voltage DV1 and the second driving voltage DV2 when a magnitude of a voltage of the second output electrode is equal to or larger than a magnitude of a reference voltage during the short detection period.

The driving unit 400 may provide the data signal DATA to the display panel 300 and provide the first control signal CON1 to the power converter 10.

The display device 1000 may be implemented using various kinds of a display panel in so far as the display panel 300 displays an image using at least two driving voltages DV1 and DV2 received from the power converter 10. For example, the display device 1000 may include an organic light emitting display device. In this case, each of the plurality of pixels included in the display panel 300 includes an organic light, emitting diode (OLED).

The display device 1000 may have the same structure as the display device 1000 of FIG. 12. A structure and an operation of the display device 1000 of FIG. 12 are described above with reference to FIGS. 1 to 21. Thus, a detailed description of the display device 1000 included in the system 6000 will not be repeated.

The processor 2000 may control the storage device 3000 and the display device 1000. The processor 2000 may perform specific calculations, computing functions for various tasks, etc. The processor 2000 may include, e.g., a microprocessor or central processing unit (CPU). The processor 2000 may be coupled to the storage device 3000 and the display device 1000 via an address bus, a control bus, and/or a data bus. In addition, the processor 2000 may be coupled to an extended bus such as a peripheral component interconnection (PCI) bus.

As discussed above, the system may include the memory device 4000 and the I/O device 5000. In some example embodiments, the system 6000 may further include a plurality of ports (not illustrated) that communicate with a video card, a sound card, a memory card, a universal serial bus (USB) device, other electric devices, etc.

The memory device 4000 may store data for operations of the system 6000. For example, the memory device 4000 may include at least on memory device such as a dynamic random recess memory (DRAM) device, a static random access memory (SRAM) device, etc., and/or at least one non-volatile memory device such as art erasable programmable read-only memory (EPROM) device, electrically erasable programmable read-only memory (EEPROM) device, a flash memory device, etc.

The I/O device 5000 may include one or more input devices (e.g., a keyboard, keypad, a mouse, a touch pad, a haptic device, etc.), and/or one or more output devices (e.g., a printer, a speaker, etc.). In some example embodiments, the display device 1000 may be included in the I/O device 5000.

The system 6000 may include any of several types of electronic devises, such as a digital television, a cellular phone, a smart phone, a personal digital assistant (PDA), a personal media player (PMP), a portable game console, a computer monitor, a digital camera, an MP3 player, etc.

A wiring for the positive driving voltage (ELVDD) and a wiring for the negative driving voltage (ELVSS) may be formed so that they overlap on the display panel. If the wiring for the positive driving voltage (ELVDD) and the wiring tear the negative driving voltage (ELVSS) are shorted with each other by, for example, a crack on the display panel and/or a foreign substance in the display panel, heating problem and/or a tire may be caused because of an overcurrent at the short circuit if the short circuit is left unchecked. In this regard, as described above, the power converter and the display device including the power converter according to the example embodiments may be able to effectively detect a minute short between wirings formed on the display panel, and shut down if needed. Example embodiments may thus provide a power converter that detects a minute short between output electrodes effectively.

As described above, example embodiments relate to a display device including the power converter, a system including the display device, and a method of driving the display device.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
a display panel including a plurality of pixels, the pixels being configured to operate in response to a first driving voltage, a second driving voltage, and a data signal;
a voltage converter that provides the first driving voltage and the second driving voltage to the display panel, the voltage converter including a first output, which outputs the first driving voltage to first wiring of the display panel, and a second output, which outputs the second driving voltage to second wiring of the display panel, the voltage converter selectively starting an output of the second driving voltage after a detection period, the detection period being after the output of the first driving voltage; and
a comparator configured to control the output of the first and second driving voltages of the voltage converter based on a magnitude of a wiring voltage corresponding to voltage on the second wiring.

2. The display device as claimed in claim 1, wherein the comparator includes:
a first input that receives the wiring voltage corresponding to the voltage on the second wiring;
a second input that receives a reference voltage; and
an output that outputs a comparison signal to the voltage converter.

3. The display device as claimed in claim 2, wherein, at the end of the detection period, the voltage converter evaluates the comparison signal and selectively starts the output of the second driving voltage depending on the evaluation of the comparison signal.

4. The display device as claimed in claim 3, wherein comparator selectively outputs the comparison signal with a first level or a second level depending on the relative magnitudes of the wiring voltage and the reference voltage, and the voltage converter starts the output of the second driving voltage if the comparison signal has the first level when evaluated by the voltage converter.

5. The display device as claimed in claim 4, wherein the voltage converter shuts down output of the first driving voltage if the comparison signal has the second level when evaluated by the voltage converter.

6. The display device as claimed in claim 2, wherein the comparison signal has the second level if the voltage at the first input, which receives the wiring voltage, is between the reference voltage and the first driving voltage.

7. The display device as claimed in claim 2, wherein the voltage converter stops providing the first driving voltage and the second driving voltage in response to a state of the comparison signal.

* * * * *